May 10, 1955 F. C. BINNALL 2,707,985
BAG MAKING MACHINE
Filed Dec. 12, 1952 13 Sheets-Sheet 1
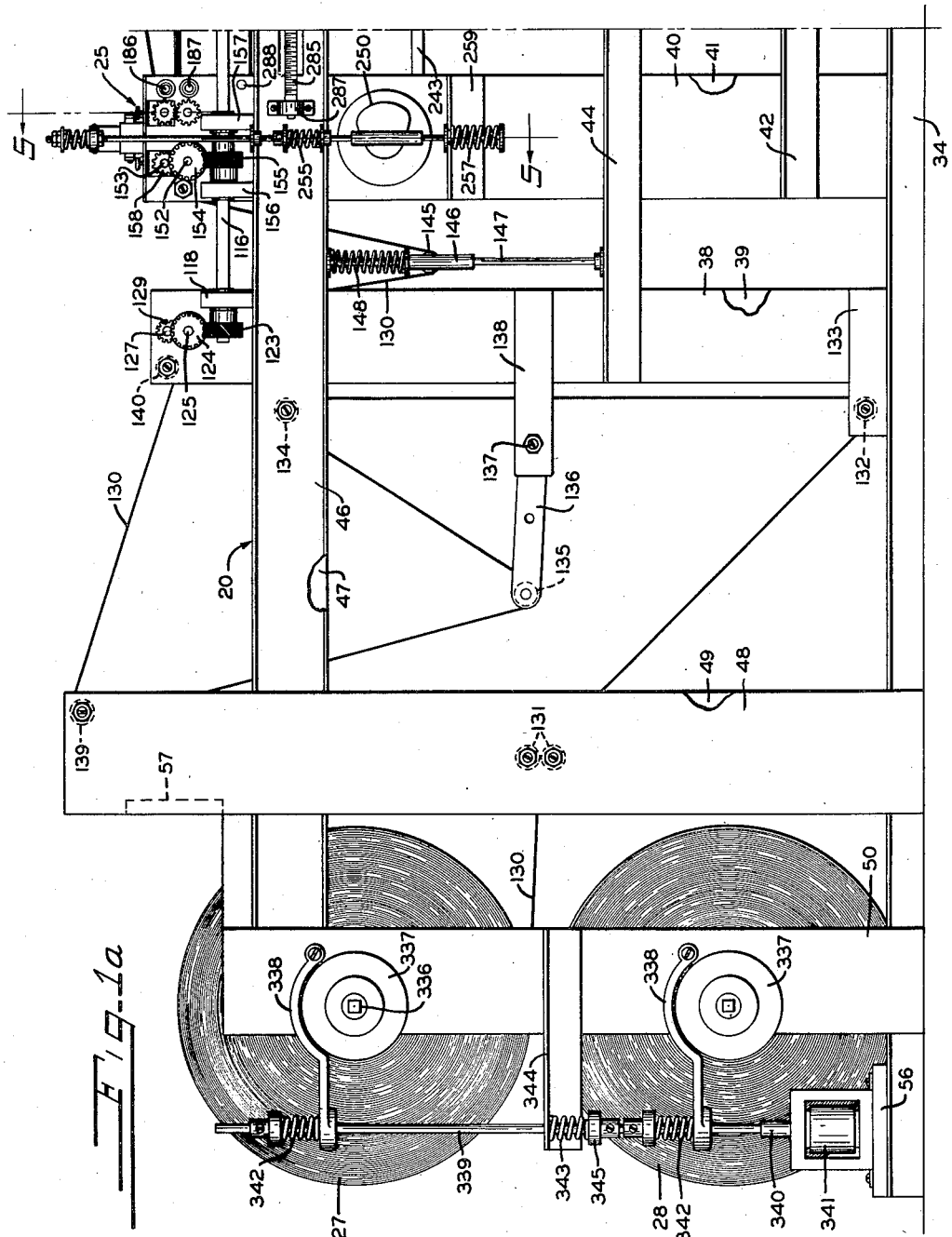
INVENTOR.
FREDERICK C. BINNALL
BY
DESJARDINS, ROBINSON & KEISER
Howard L Keiser
HIS ATTORNEYS

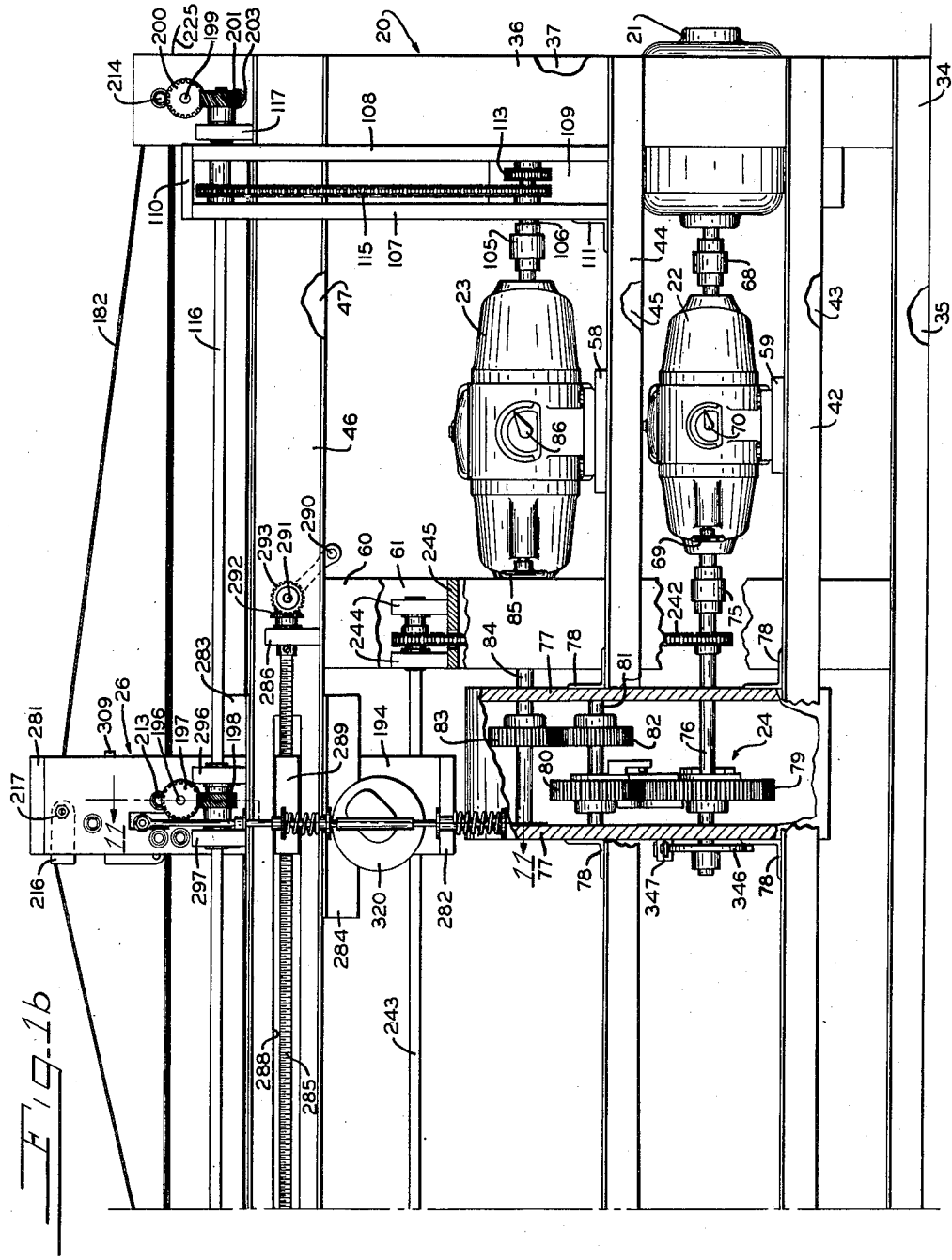

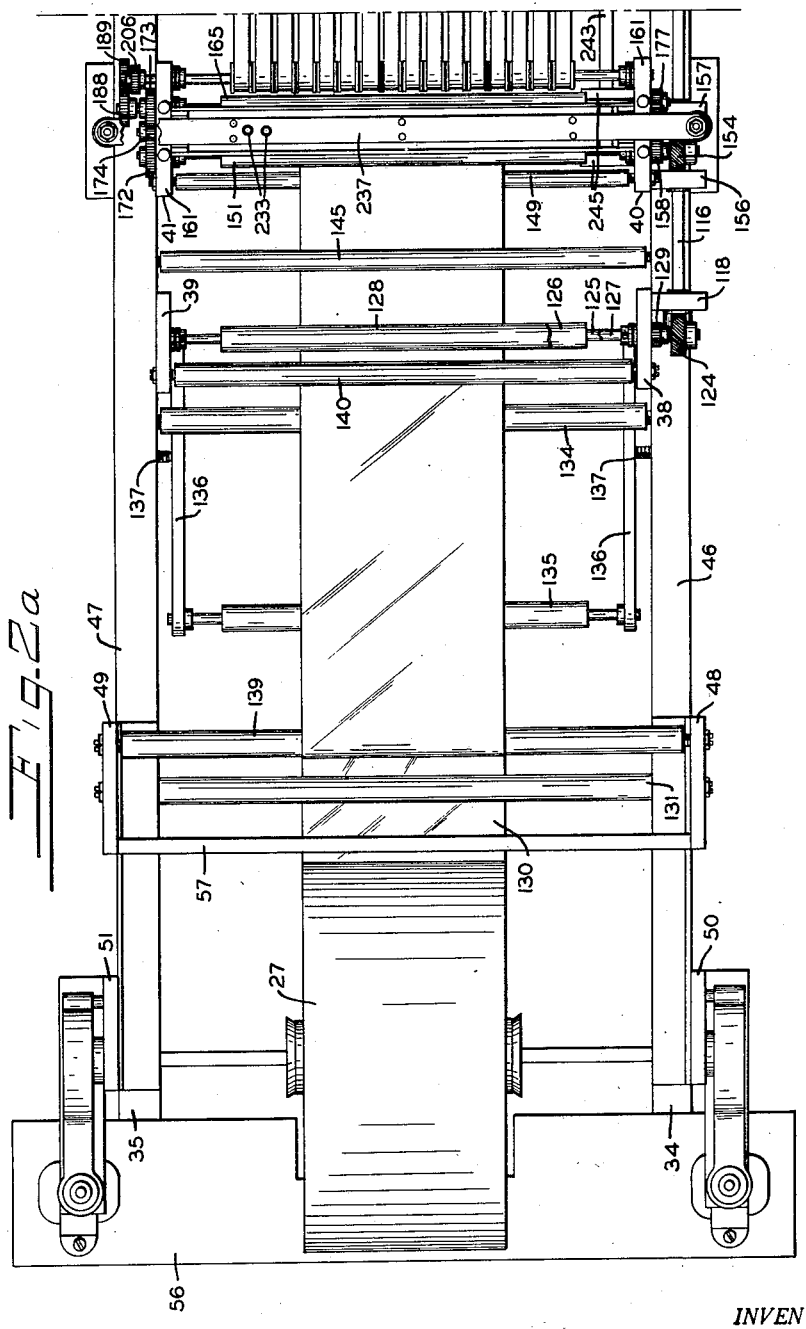

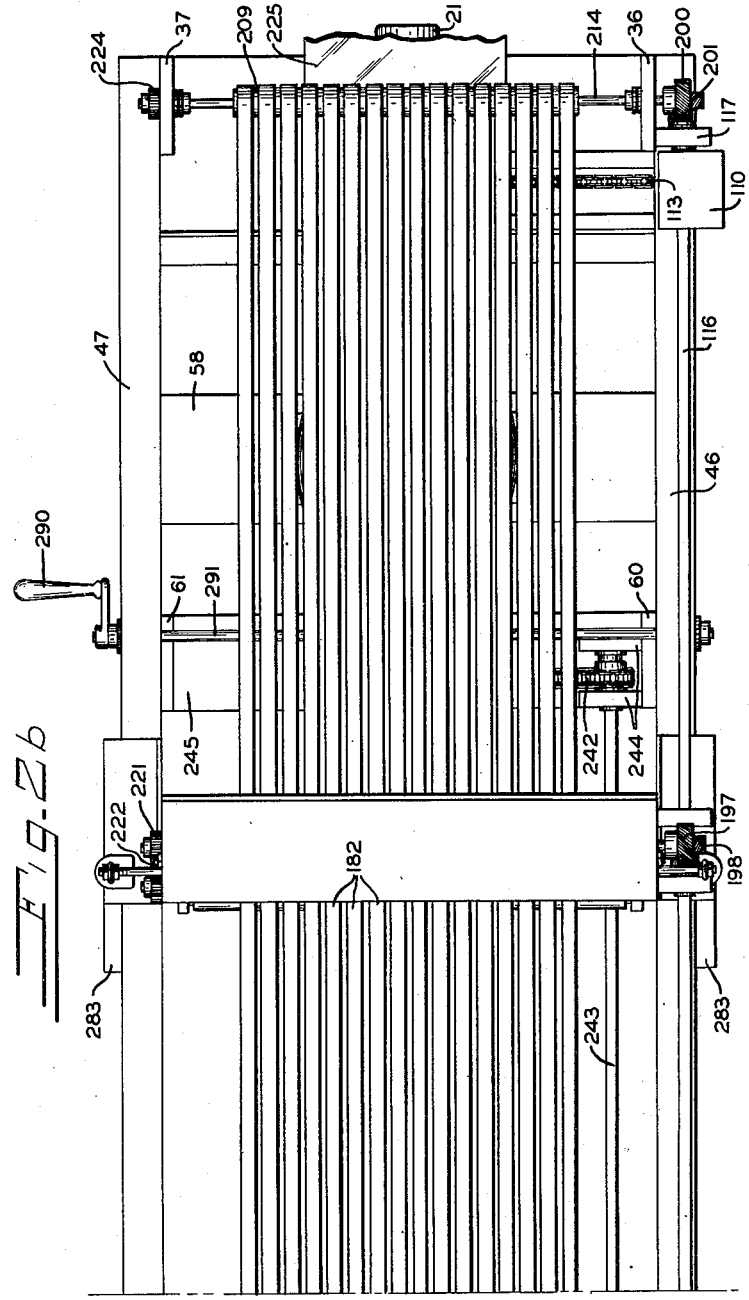

May 10, 1955  F. C. BINNALL  2,707,985
BAG MAKING MACHINE
Filed Dec. 12, 1952  13 Sheets-Sheet 5
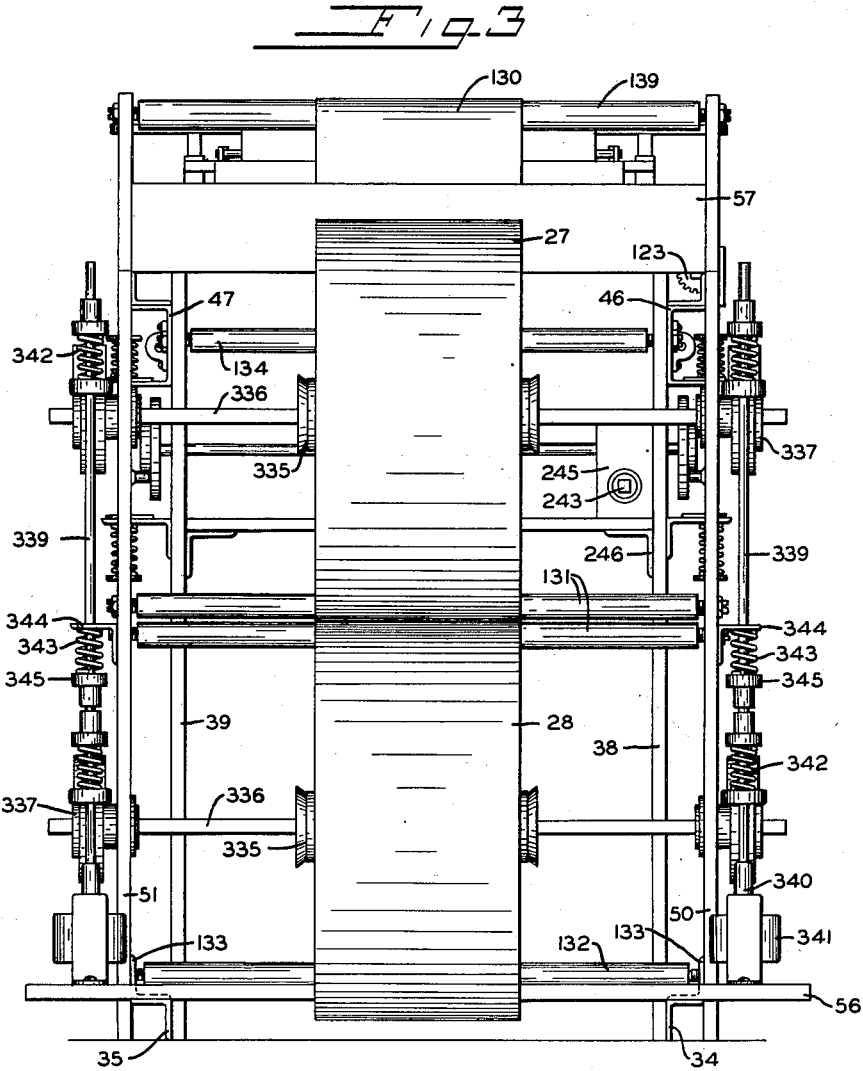
INVENTOR.
FREDERICK C. BINNALL
BY
DESJARDINS, ROBINSON & KEISER
HIS ATTORNEYS

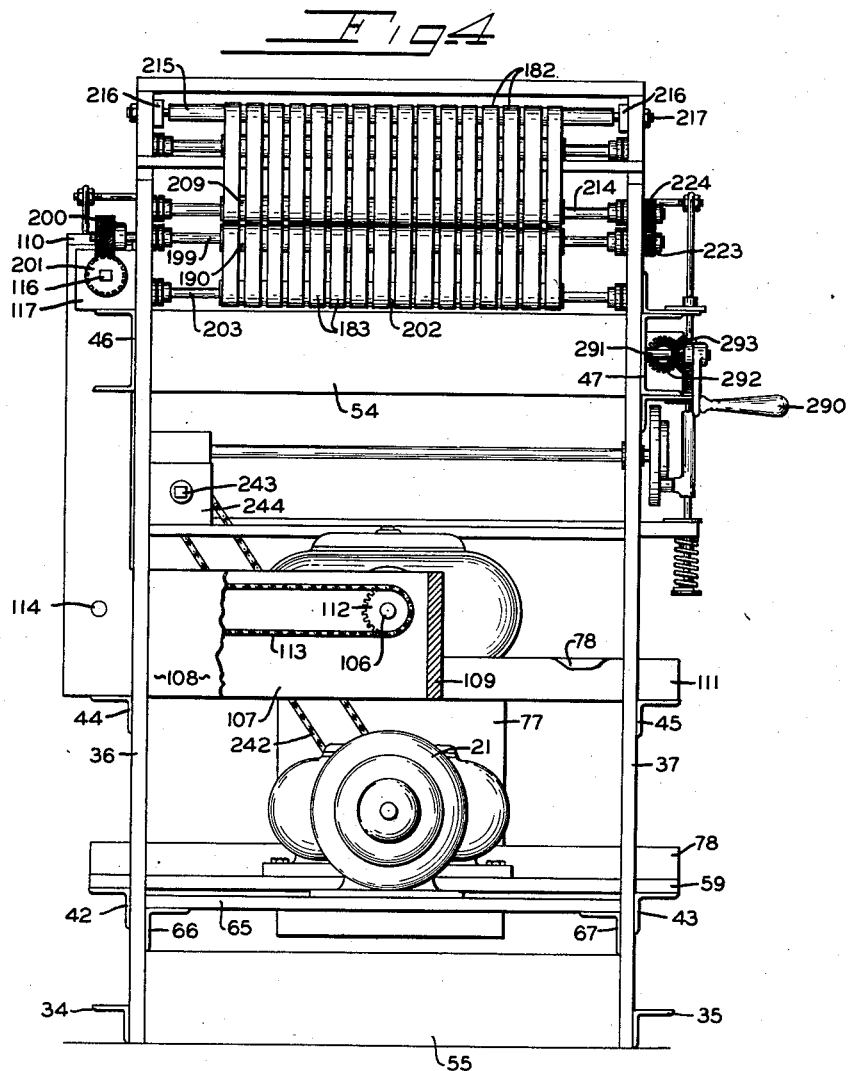

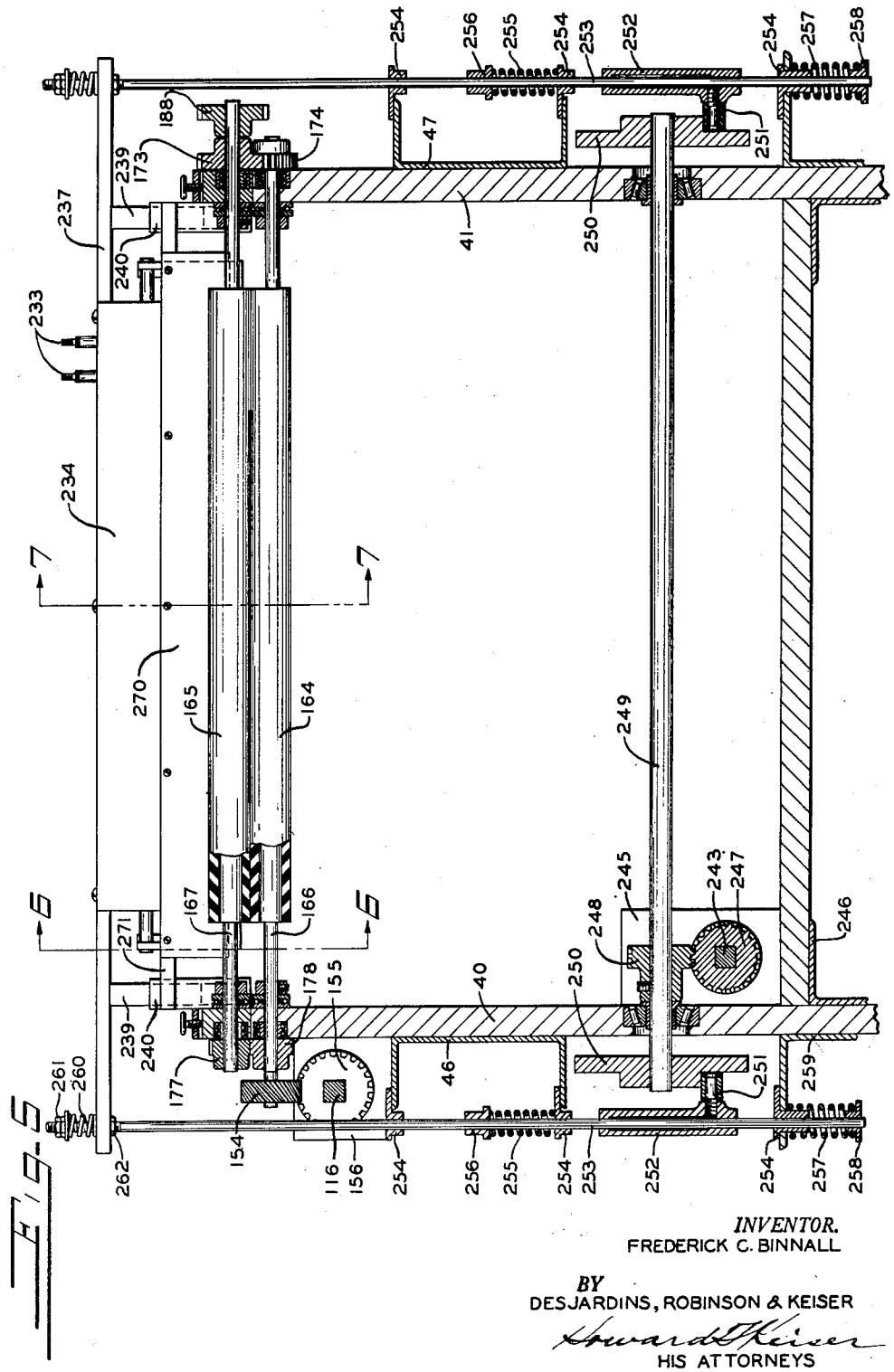

May 10, 1955  F. C. BINNALL  2,707,985
BAG MAKING MACHINE
Filed Dec. 12, 1952  13 Sheets-Sheet 8
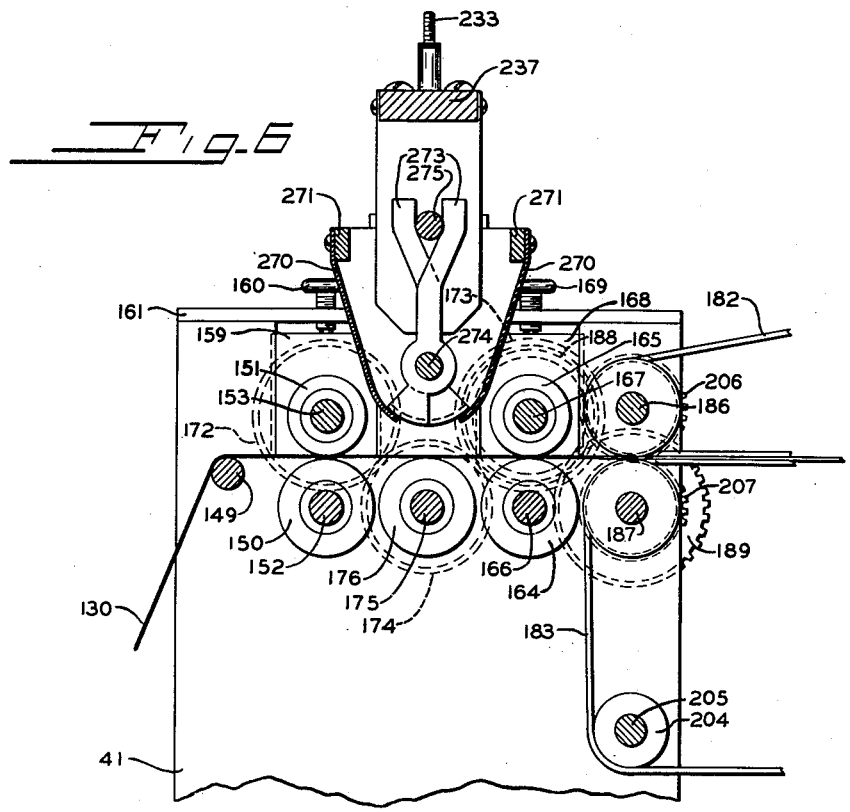
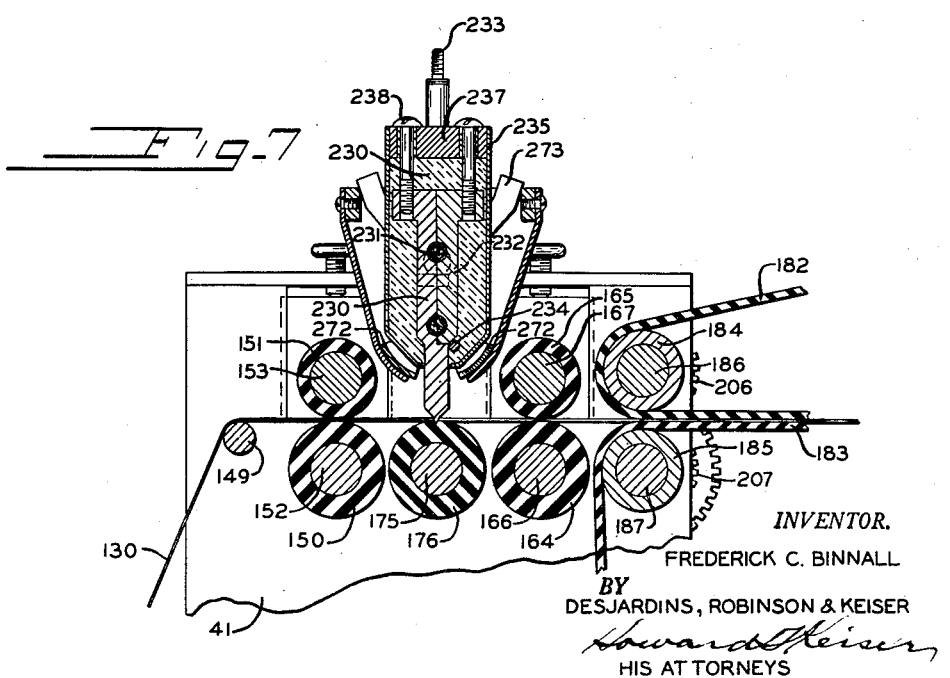
INVENTOR.
FREDERICK C. BINNALL
BY
DESJARDINS, ROBINSON & KEISER
HIS ATTORNEYS

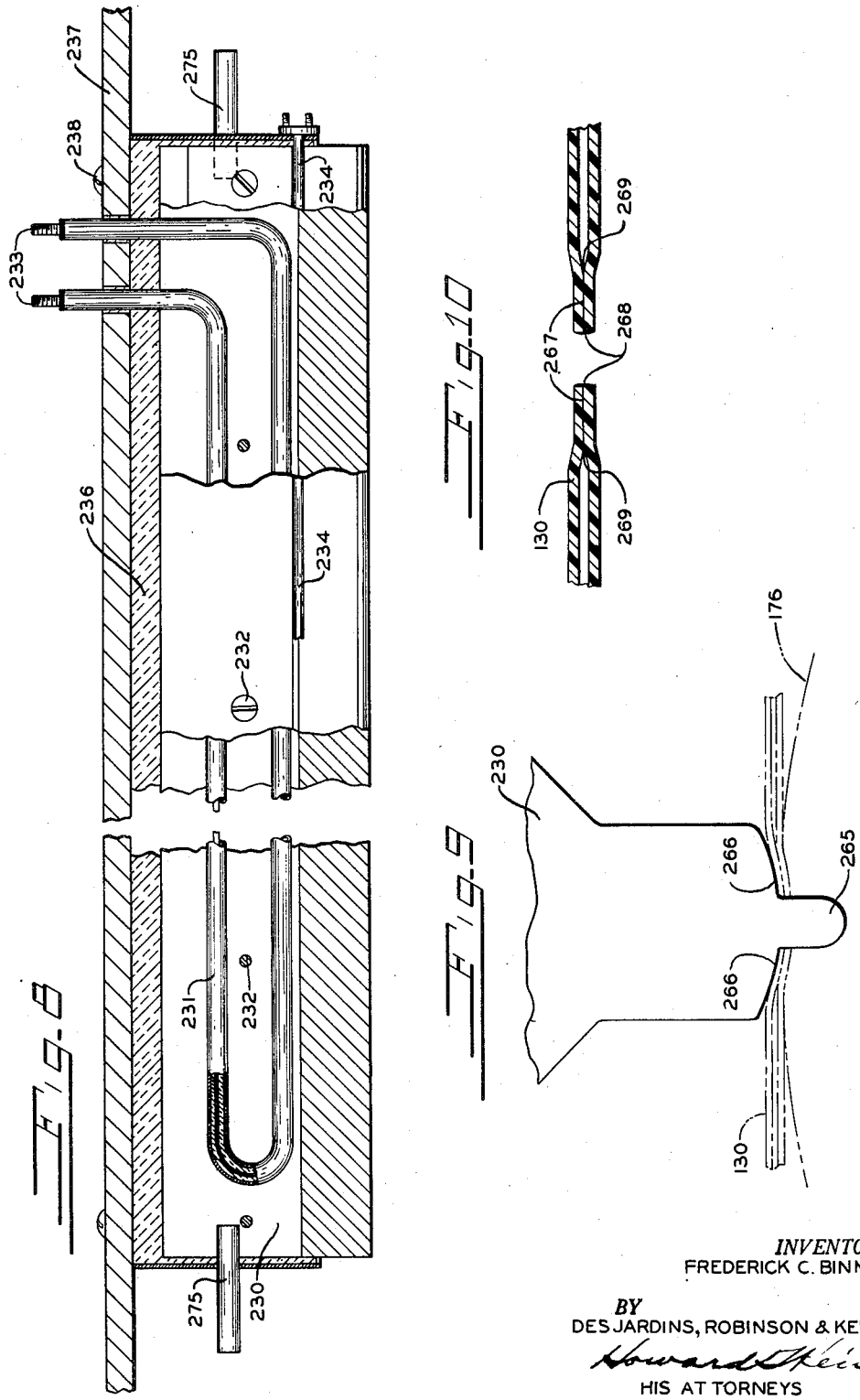

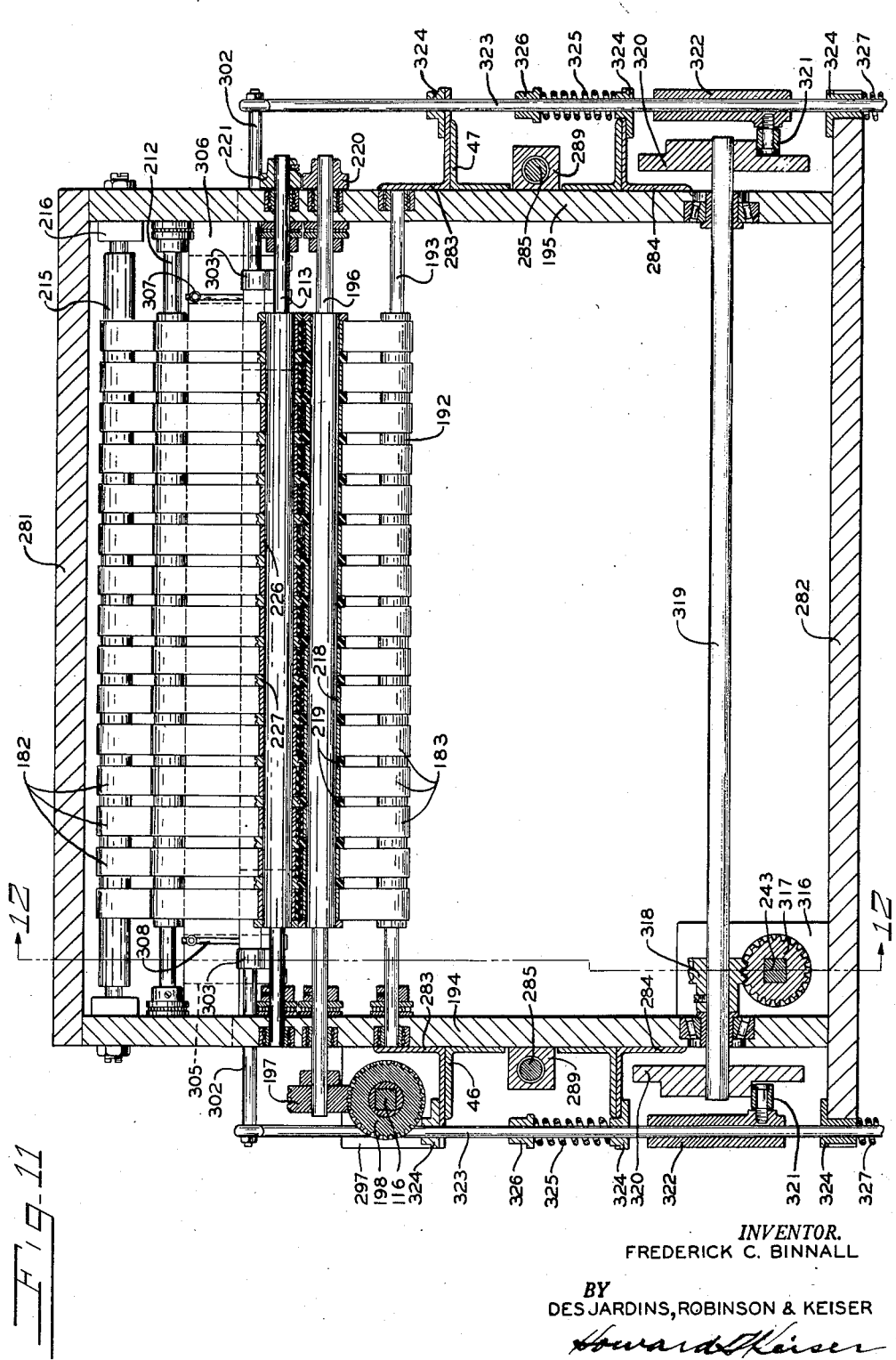

May 10, 1955   F. C. BINNALL   2,707,985
BAG MAKING MACHINE
Filed Dec. 12, 1952   13 Sheets-Sheet 11

INVENTOR.
FREDERICK C. BINNALL
BY
DESJARDINS, ROBINSON & KEISER
HIS ATTORNEYS

May 10, 1955    F. C. BINNALL    2,707,985
BAG MAKING MACHINE
Filed Dec. 12, 1952                     13 Sheets-Sheet 12
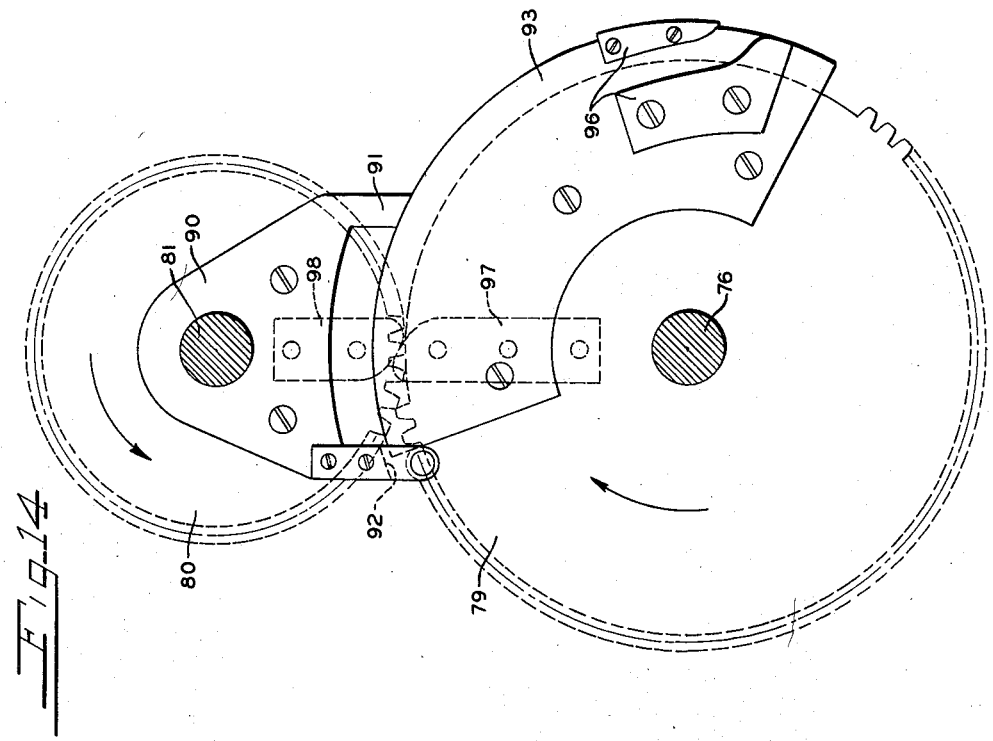
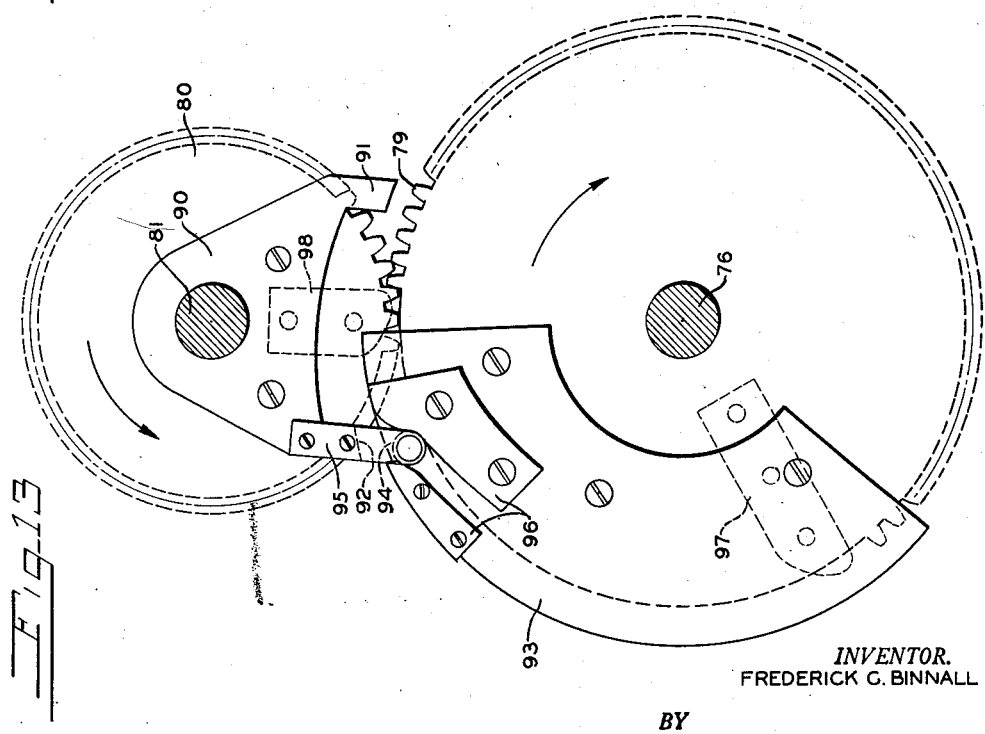
INVENTOR.
FREDERICK C. BINNALL
BY
DESJARDINS, ROBINSON & KEISER
HIS ATTORNEYS May 10, 1955 F. C. BINNALL 2,707,985
BAG MAKING MACHINE
Filed Dec. 12, 1952 13 Sheets-Sheet 13
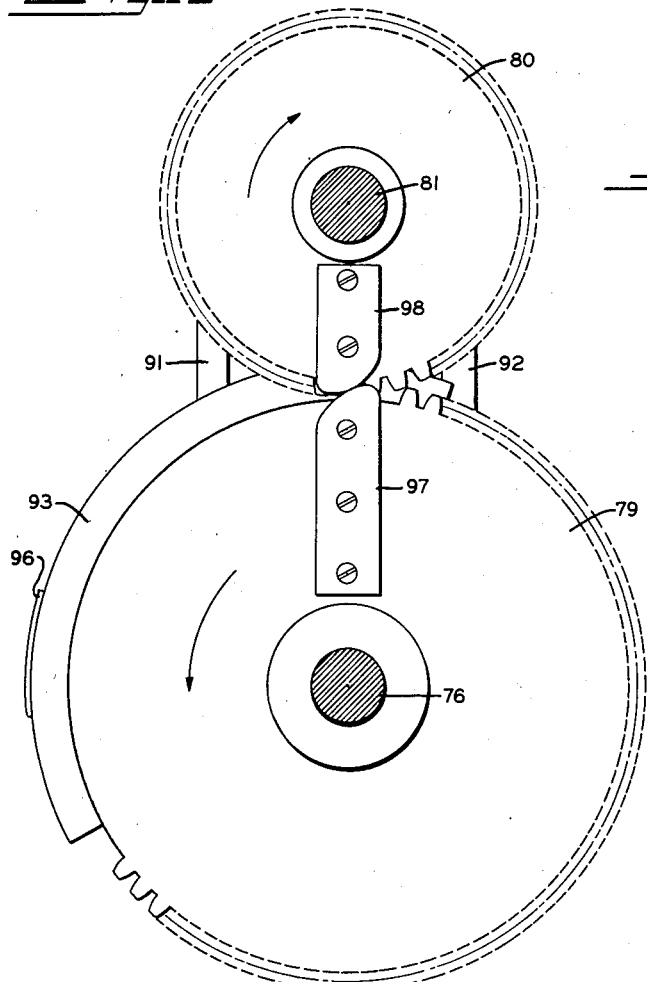
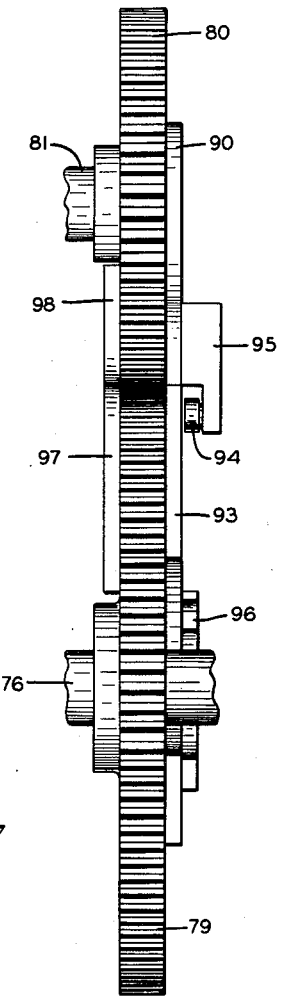
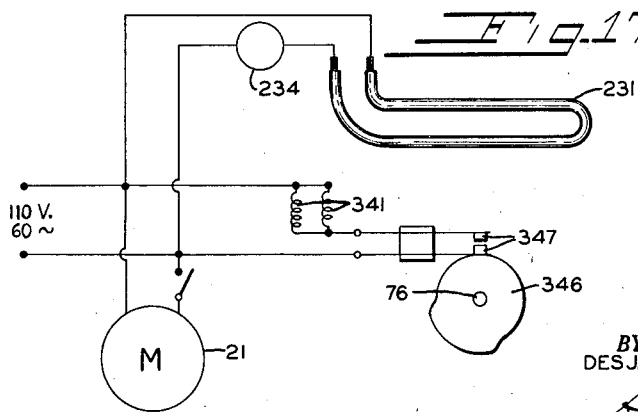
*INVENTOR.*
FREDERICK C. BINNALL
BY
DESJARDINS, ROBINSON & KEISER
HIS ATTORNEYS

2,707,985

BAG MAKING MACHINE

Frederick C. Binnall, River Forest, Ill.

Application December 12, 1952, Serial No. 325,664

23 Claims. (Cl. 154—42)

This invention relates to bag making machines and has to do more particularly with a machine for forming bags from a continuous web of thermoplastic tubing in a completely automatic manner and at a high rate of speed.

The present day practice of forming bags from a continuous length of tubular, thermoplastic film stock consists in advancing the stock the length of one bag, then dwelling for approximately three-quarters of a second during which time the material is sealed transversely of its length by a bar heated to about 300° to 350° F. A knife is operated simultaneously with the weld bar to cut off the material ¼ inch or so below the seal. This mode of operation is slow and the excess stock remaining beneath the seal represents wasted material insofar as any utility thereof is concerned. Also, in the presently known machines, the weld bar must be maintained in very accurate adjustment so that the edge of the bar will bear with uniform pressure against the material being welded along the entire length of the seam. It is quite difficult to maintain the bar in adjustment since the heating thereof usually causes warping either vertically or horizontally and even a few thousandths of an inch of warpage will prevent even welding of the seam and make necessary the replacement of the bar.

In the bag making machine forming the subject matter of this invention, the bags are formed from a continuous strip of tubular, thermoplastic film stock which is advanced a distance equal to the length of two bags on each feed of the strip material. During each dwell between successive feeds of thermoplastic film stock, the weld bar is operated to seal the ends of two bags simultaneously and, at the same time, to cut the film between the welds by the action of heat and pressure applied to the material by the weld bar. Thus, during each feed of the film stock, a double length sleeve sealed on both ends is produced. This sleeve is cut in two by a knife which is spaced one bag length from the weld bar in the direction of travel of the tubular film stock. This knife is operated during each dwell of the film stock the same as the weld bar. Hence, two bags each sealed on one end and open at the other end are produced on each stroke of the machine. This constitutes an important distinction between my machine and the prior art bag machines in which only one bag is made on each stroke of the machine. It is quite easy, therefore, with my machine to produce twice as many bags during a given period of time as with the machines presently being made and used for producing thermoplastic bags.

The simultaneous welding of the ends of two bags at once is rendered possible by the novel design and mode of operation of the weld bar which I employ in my machine. My bar is operated at a much higher temperature than those found in conventional bag making machines and an elastic roll is provided beneath the bar into which the edge of the bar may be pressed when it is brought down against the web of film stock. The edge of the bar is provided with a longitudinally extending rib or tenon which is pressed into the elastic roll and operates to cut through the film stock and sever it at this point. Just above the tenon, the weld bar is provided with a pair of slightly inclined shoulders, one on either side of the tenon, which shoulders press the severed edges of the film stock against the elastic roll and provide a weld in the neighborhood of thirty to forty one-thousandths of an inch wide. At the same time, the narrow tenon portion of the weld bar melts the thermoplastic material on the end of the cut thereby providing a butt weld along the edge of the seam.

Due to the inclination of the shoulders on the weld bar, the pressure of the shoulders on the film is gradually reduced toward the inner edge of the weld so that there will be no brittle edge produced along the edge of the weld. Thus, an entirely new type of weld is provided along each edge of the severed material, this being actually a double weld, i. e., a lap weld and a butt weld. This weld is actually stronger than the material itself despite the extreme narrowness thereof.

Since my weld bar is operated at a considerably higher temperature than the weld bars of conventional machines, that is between 500° to 600° F. in place of 300° to 350° F., the time required for effecting the weld of the two adjacent edges of the material is from 100 to 150 milliseconds as compared with 500 to 750 milliseconds required to seal the material with a bar heated from 300 to 350° F. Hence, the dwell time required for welding the edges of the bag is drastically reduced. This saving of time is very important for it enables much higher rates of production to be secured from the machine.

It is also to be noted that since the weld bar goes completely through the film stock and presses into the elastic roll, no precise adjustment of the bar is required in order to provide a uniform pressure along the edges being welded. Hence, it is much easier to maintain the weld bar in proper adjustment in my machine than in machines of known construction and warpage of the bar due to heating, unless of an extreme character, will not affect the proper operation of the bar or result in an inferior or defective weld. Also, it is unnecessary to maintain a close adjustment of the temperature of the weld bar as in the case of prior art machines since the narrow tenon on the weld bar passes through the film stock and into the elastic roll thereby insuring severing and welding of the edges of the material despite a certain amount of fluctuation in the temperature of the bar.

It is therefore an object of the present invention to provide a bag making machine which is capable of producing bags at a rate which is several times as great as that of any of the presently known bag making machines.

It is a further object of my invention to provide a bag making machine in which the thermoplastic film stock is advanced the length of two bags on each feeding operation of the machine and in which the weld bar cuts and seals the ends of two bags simultaneously.

Another object of my invention is to provide a plastic bag making machine having an elastic roll disposed on the opposite side of the plastic, bag forming material from the weld bar, and with which the weld bar cooperates in cutting and sealing the ends of two bags simultaneously.

Another object of my invention is to provide a weld bar having a longitudinally extending tenon surmounted by a pair of slightly inclined shoulders which are adapted to cooperate with an elastic roll disposed beneath the thermoplastic film stock being welded.

Another object of the invention is to provide, in a plastic bag making machine, a weld bar which cooperates with an elastic roll disposed beneath the bag forming material and having a portion which is adapted to cut through the material and sink into the material of the roll, and other portions which are adapted to press the edges of the bag forming material against the surface of the elastic roll and provide a weld thereon.

Another object of my invention is to provide, in a plastic bag making machine, a novel welding device which simultaneously cuts and seals the bag forming material, the cut being made contiguous with the seal so as to eliminate the waste material usually left on the bag below the seal.

Another object of the invention is to provide, in a plastic bag making machine, a welding device which produces both a lap and a butt weld of the joint formed along the edge of the bag.

Another object of the invention is to provide a plastic bag making machine in which the adjustment of the weld bar is not critical and in which ordinary warpage of the bar due to heating will not result in a defective joint or seam.

Another object of the invention is to provide a plastic bag making machine in which the welding operation is performed in a fraction of the time formerly required.

In the machine hereinafter to be disclosed, the drive of the feed rolls, by means of which the tubular, thermoplastic film stock is moved through the machine, is such that both the time of the dwell of the rolls between feeding strokes and the length of the material fed on each stroke may be infinitely varied as desired. This is accomplished by interposing between the driving motor and the feed rolls of the machine driven thereby a pair of variable speed drives between which is interposed an intermittent gear drive mechanism. Thus, by varying the speed ratio of the drive between the motor and the intermittent gear drive mechanism, the number of feeds or indexes of the material per minute may be adjusted as desired. The feed of the film stock may be adjusted by varying the drive ratio of the second variable speed drive mechanism which is interposed between the intermittent gear mechanism and the feed rolls of the machine. By this novel arrangement of the driving mechanism, a very flexible drive is provided and one in which the number of feeds per minute and the length of the film feed per stroke may be infinitely varied thereby greatly facilitating the adjustment of the machine to handle bags of varying lengths. With this mechanism, the drive take-off for the cams which operate the weld bar and the cut-off knife is located between the first variable speed drive and the intermittent drive mechanism so that the cams will be maintained in synchronism with the start and stop motion of the feed rolls and will also continue to rotate while the feed rolls are stationary during the dwell period.

Accordingly, it is a further object of my invention to provide a novel drive for the feed rolls of a bag making machine wherein the number of feeding strokes per minute of the bag forming material may be infinitely varied as may also the length of the material advanced on each feeding stroke of the machine.

It is another object of my invention to provide, in a bag making machine having a drive of the character described in the preceding object, a power takeoff for operating the weld bar and the cut-off knife of the machine in synchronism with the intermittent rotation of the feed rolls.

In my machine I have also provided for adjustment of the cut-off knife with relation to the weld bar so that as the length of the film feed is adjusted to produce bags of different lengths, the position of the cut-off knife with relation to the weld bar may likewise be adjusted so as to insure that the double-length sleeve sealed at both ends may be cut exactly midway between the sealed ends thereof. In this way bags of equal length will be provided although it is possible, of course, by throwing the knife off center, to provide two bags of different lengths instead of bags of equal length. Thus, if the length of the double-welded sleeve is 18 inches, the knife, if set 10 inches away from the weld bar will cause bags of 8 and 10 inch lengths to be produced simultaneously.

Therefore, it is another object of my invention to provide, in a plastic bag making machine, a cut-off knife whose position may be adjusted with respect to the weld bar of the machine so that the lengths of the bags produced by the machine may be adjusted to suit the requirements of the user.

With these and other objects in view which will become apparent from the following description, the invention includes certain novel features of construction and combinations of parts the essential elements of which are set forth in the appended claims and a preferred form or embodiment of which will hereinafter be described with reference to the drawings which accompany and form a part of this specification.

In the drawings:

Figs. 1a and 1b together constitute a front elevation of the complete bag-making machine.

Figs. 2a and 2b together constitute a top plan view of the machine shown in Figs. 1a and 1b.

Fig. 3 is an end elevation of the machine shown in Figs. 1a and 1b as viewed from the left-hand end thereof.

Fig. 4 is an end elevation of the machine shown in Figs. 1a and 1b as viewed from the right-hand end thereof.

Fig. 5 is a vertical cross-section through the machine taken along the line 5—5 in Fig. 1a.

Fig. 6 is a vertical cross-section through the machine taken along the line 6—6 in Fig. 5.

Fig. 7 is a vertical cross-section taken through the machine along the line 7—7 in Fig. 5.

Fig. 8 is a detail view of the weld bar with a portion of the bar shown in cross-section.

Fig. 9 is an enlarged end view of a portion of the weld bar.

Fig. 10 is a greatly enlarged cross-sectional view taken through the film stock showing it as it appears after being cut and welded by the weld bar.

Fig. 11 is a vertical cross-section through the machine taken along the line 11—11 in Fig. 1b.

Fig. 13 is a view showing the intermittent gear drive showing the parts in the positions they assume at the beginning of the dwell period of the feed rolls.

Fig. 14 is another view of the intermittent gear drive showing the parts in the positions which they occupy at the end of the dwell period.

Fig. 15 is a view of the reverse side of the intermittent gear drive showing the pick-up cams which come into operation at the end of the dwell period.

Fig. 16 is an end view of the intermittent gear drive mechanism.

Fig. 17 is a wiring diagram of the electrical components of the machine.

General organization

Figure 12:
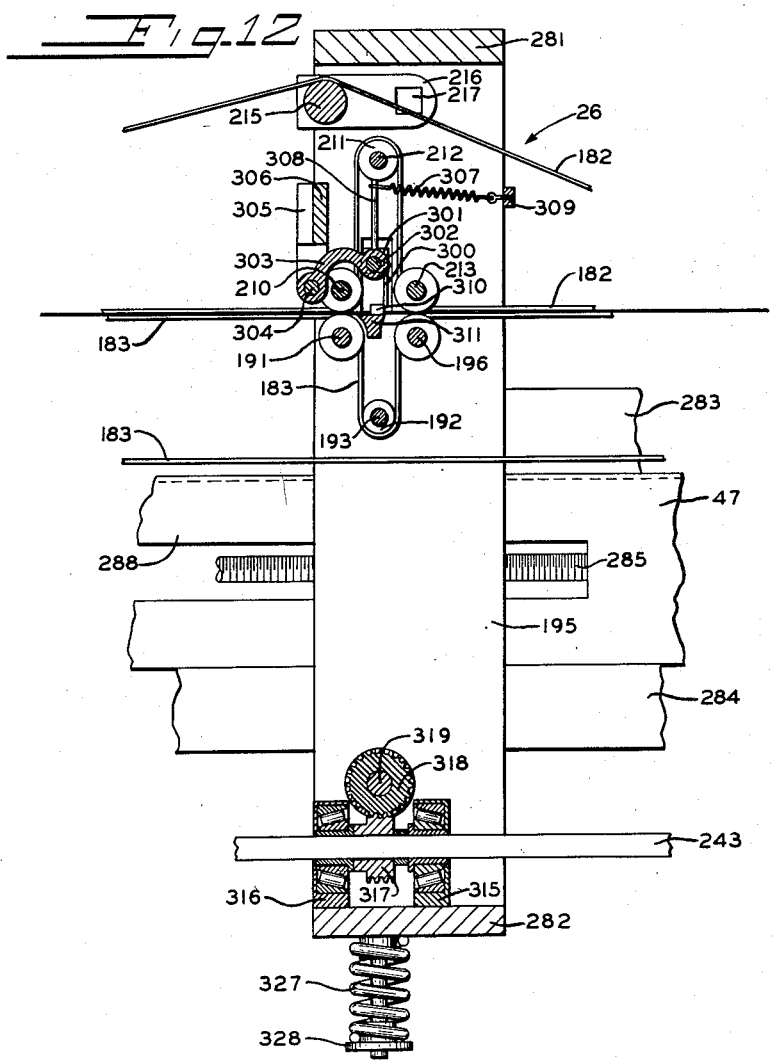
Fig. 12 is a cross-sectional view taken along the line 12—12 in Fig. 11 showing certain details of the knife mechanism.

The general organization and arrangement of the various component parts of my novel plastic bag making machine may best be seen by referring to Figs. 1a and 1b which, together, comprise a front view of the complete machine. As may be seen from this composite figure, the machine includes a frame 20 constructed of various structural iron members which are welded or otherwise securely fastened together to form a strong, rigid structure for supporting the various component parts of the machine. The operating mechanism of the machine is driven by an electric motor 21 which drives a first variable speed drive mechanism 22 which, in turn, drives a second variable speed drive mechanism 23 through an intermittent gear drive 24. By this means a drive is provided for the feed rolls of the machine which rolls intermittently advance the tubular, thermoplastic film stock through the machine. This drive also furnishes power for operating the weld bar located at the weld station 25 and the cut-off knife located at the knife station 26. The tubular thermoplastic film stock from which the bags are made is supplied to the machine from one or the other of the supply rolls 27 or 28 which are suitably supported one above the other at the left-hand end of the machine. When the supply of film from one roll is exhausted, film is supplied from the other roll while the first roll is replaced.

In the operation of the machine, the flat, double-thickness web of thermoplastic bag-forming material is fed first to the weld station 25 where the web is severed transversely of its length and the edges of the material are sealed together along either side of the cut. The feed rolls are then operated to advance the web of film stock through a distance equal to two bag lengths when the weld bar is again operated to sever the web and seal the two adjacent edges of the film stock as before. Simultaneously, the cut-off knife situated at the knife station 26 is operated to sever the piece of tubing between the two sealed ends thereof so as to form two bags which are sealed at one end and open at the other end. The machine may be adjusted to produce bags of different sizes by adjusting the second variable speed drive 23 so as to increase or decrease the length of the feed for each operation of the feed rolls. Also, the knife station 26 may be adjusted relative to the weld station 25 to enable the double-welded sleeves to be cut at the proper place to provide bags of the desired length. Also, by adjustment of the variable speed drive 22, the number of feeding strokes per minute of the machine may be increased or decreased as desired.

Frame

The frame of the machine is shown in Figs. 1a, 1b, 2a, 2b, 3 and 4 and includes a pair of spaced-apart, longitudinally extending angles 34 and 35 which extend along the bottom of the frame and constitute the ground-engaging portion of the structure. A pair of upright plates 36 and 37 are welded or otherwise rigidly secured to the right-hand ends of the angles 34 and 35 and a similar pair of plates 38 and 39 are welded to these angles near the other end of the machine as shown in Fig. 1a. A third pair of upright plates 40 and 41 are attached to the angles 34 and 35 just to the right of the second pair of plates 38 and 39 as shown in Fig. 1a. The plates 40 and 41 provide support for the weld bar and its related mechanism. Secured to the upright pair of plates 36—37 and 40—41 is a pair of longitudinally extending angles 42 and 43 and immediately above these is another pair of longitudinally extending angles 44 and 45 which extend to the left as far as the upright plates 38 and 39. Also secured to the three pairs of upright plates and extending practically entirely throughout the length of the machine is a pair of channels 46 and 47 which, near their left-hand ends provide support for a pair of upright plates 48 and 49 secured at their bottoms to the angles 34 and 35. The channels also provide support for another pair of upright plates 50 and 51 which are secured at their lower ends to the angles 34 and 35, the latter pair of plates providing support for the film stock supply rolls 27 and 28. In the portion of the frame so far described, the even-numbered parts form what may be termed the front side of the frame while the odd-numbered parts form what may be termed the rear side of the frame. The front and rear sides of the frame are maintained in spaced relation by various cross members such as a base plate 56 shown in the lower left-hand corner of Fig. 1a, which is mounted upon and secured to the angles 34 and 35, a spreader plate 57 which is mounted between the upright plates 48 and 49, a support plate 58 for the variable speed drive 23 (Fig. 1b), a support plate 59 for the first variable speed drive 22, and a pair of end spreader plates 54 and 55 (Fig. 4) extending between the upright plates 36 and 37. The plates 58 and 59 rest upon the pairs of angles 44—45 and 42—43, respectively, and are securely attached thereto. The machine frame also includes a pair of upright plates 60 and 61 which are secured to the pairs of angles 34—35, 42—43 and 44—45 and also to the pair of channels 46—47.

Drive mechanism

As earlier mentioned herein, the drive of the present machine includes an electric motor 21 a first variable speed drive 22, and intermittent gear drive 24, and a second variable speed drive 23. As best shown in Fig. 4 the electric motor 21 is supported on a transverse base plate 65 which is supported between the upright pair of plates 36—37 on angles 66 and 67 secured to the inner faces of the plates. The shaft of the electric motor 21 is connected with the input shaft of the first variable speed drive 22 by a flexible coupling 68. The drive 22 may embody any of the well known constructions wherein the ratio of the speed of the output shaft to that of the input shaft may be gradually and continuously varied by rotation of the hand wheel 69. The speed ratio for which the drive is adjusted is indicated by a pointer 70 which moves across a suitable scale inscribed on a stationary plate fixed to the frame of the drive 22. Hence, by suitable adjustment of the variable speed drive mechanism, the output shaft thereof may be caused to operate at a predetermined fraction of the speed of the motor and this adjustment may be made in an infinitely variable manner. The output shaft of the variable speed drive 22 is connected through a flexible coupling 75 with an input shaft 76 of the intermittent gear drive mechanism 24 which is housed within a casing 77. This casing is supported midway between the front and rear sides of the machine frame by angles 78 extending transversely of the machine and supported at either end by the pairs of angles 42—43 and 44—45. Secured to the input shaft 76 is a mutilated gear 79 (see also Figs. 13, 14, 15 and 16) which runs in oil contained in the bottom part of the casing and is adapted to mesh with a smaller gear 80 which is a conventional spur gear, i. e., one having teeth entirely around its periphery. The number of teeth on the mutilated gear 79 is equal to the number of teeth on the smaller gear 80 so that for each rotation of the mutilated gear the smaller gear 80 will make one complete revolution. As shown in Fig. 1b, the gear 80 is fast on a shaft 81 which is journaled in the sidewalls of the casing 77. Also secured to the shaft 81 is a gear 82 which meshes with a gear of equal size 83, which is fast on a shaft 84 journaled in the sidewalls of the casing 77. The shaft 84 is connected by a flexible coupling (not shown) with the input shaft of the second variable speed drive 23 so that this drive is intermittently rotated by the intermittent gear drive 24. The variable speed drive 23 is similar to the variable speed drive 22 and is provided with a hand wheel 85 by means of which the speed ratio of the output with respect to the input may be gradually and continuously varied by adjustment of the hand wheel 85, the pointer 86 indicating on the dial the speed ratio of the drive.

The intermittent gear drive 24 is of the type in which the driven shaft is positively locked during the time that it is at rest. This is accomplished by means of a lock plate 90 (Fig. 13) which is secured to one face of the gear 80, the plate 90 being provided with a pair of locking shoulders 91 and 92 which, during the dwell period of the driven gear 80, are adapted to ride on the periphery of a plate 93 secured to the face of the mutilated gear 79. To eliminate hammering of the locking shoulder 92 against the periphery of the plate 93 at the end of the rotating period of the gear 80, an arm 95 secured to the plate 90 carries a roller 94 which moves into a cam track formed by plates 96 secured to the face of the plate 93. The track provided by the plates 96 is such that as the last tooth of the gear 79 disengages from the teeth of the gear 80 at the end of the rotating period, the roller 94, which is moving downward at this time, enters the cam track provided by the plates 96 and, as the mutilated gear 79 continues to turn clockwise in Fig. 13, the shoulder 92 will gradually be brought down against the periphery of the plate 93. When the roller 94 leaves the track provided by plates 96, the leading edge of the plate 93 will move beneath the shoulder 91 and the gear 80 will be held against rotation during its dwell period.

At the end of the dwell period of gear 80, the first tooth on the mutilated gear 79 will contact a tooth on the gear 80 and initiate rotation of the latter gear. This will take place just after the rear edge of plate 93 moves out from under the shoulder 93 (Fig. 14). Since the gear 80 is at rest when the first tooth on the mutilated gear 79 strikes a tooth on the gear 80, the strain on the first tooth of gear 79 is quite severe and may cause breakage of the tooth when the mechanism is operated at high speed. In order to relieve the load on the first tooth of gear 79 and prevent breakage thereof, a pair of pick-up plates 97 and 98 are secured on the reverse sides of the gears 79 and 80, respectively. As shown in Fig. 15, the outer ends of these plates are provided with faces which follow an involute curve so that essentially rolling contact will occur between the plates as the gears revolve. The positioning of the plates is such that the curved face of the plate 97 will strike against the curved face of the plate 98 just prior to the engagement of the first tooth on the mutilated gear 79 with one of the teeth on the gear 80 so that the rotation of the gear 80 will be initiated by the contact of the plate 97 against the plate 98 thereby eliminating the sharp blow on the first tooth of the mutilated gear. The gear 80 is therefore brought smoothly into motion at the beginning of its operating or rotating period and breakage of the gear will be prevented.

From the proportioning of the mutilated to the unmutilated portions of the gear 79, it will be seen that the gear 80 will be driven during approximately ⅔ of each revolution of the input shaft 76 and will remain at rest during the remaining ⅓ of a revolution of this shaft. Also, it will be seen that the speed at which the input shaft 76 is operated will determine the number of operating strokes and dwell periods per minute of the feed mechanism since the output of the intermittent gear drive mechanism is applied to the input of the second variable speed drive 23. The output of this drive 23, though it will start and stop the same number of times per minute as the output of the intermittent gear drive, the extent of rotation of the output shaft of the unit 23 may be varied by adjusting the speed ratio of the unit by the hand wheel 85. In this way, the length of feed of the film stock through the machine may be varied in the desired manner.

The output shaft of the variable speed drive 23 is connected through a flexible coupling 105 with a countershaft 106 (see also Fig. 4) journaled between the L-shaped plates 107 and 108 which are connected by an end plate 109 and a top plate 110. The bottoms of the plates 107 and 108 rest on the longitudinally extending angle 44 and the plate 107 is additionally supported by a transverse angle 111 supported between the pair of angles 44—45. Secured to the counter-shaft 106 is a sprocket 112 which, through a chain 113 drives a sprocket secured to a jack-shaft 114 journaled between L-shaped plates 107 and 108 at the front side of the machine. A second sprocket is secured on the jack-shaft 114 which is connected by a chain 115 with a sprocket having a square hole therein for receiving a square drive shaft 116 extending longitudinally along the front side of the machine.

As shown in Fig. 1b the right-hand end of the square shaft 116 is supported by a bearing block 117 (see also Fig. 4) which rests upon the upper flange of the channel 46 and is secured thereto and also to the front face of the upright plate 36. The square drive shaft is supported for rotation within the block 117 by means of a roller bearing, the inner race of which is provided with a square aperture for receiving the shaft 116. At its left-hand end, the shaft 116 is similarly supported by a bearing block 118 (Fig. 1a) resting upon the top flange of the channel 46 and secured to the front face of the upright plate 38. The shaft is supported for rotation in the block 118 by means of a roller bearing similar to the one employed in the block 117.

*Feed rolls*

At its extreme left-hand end, the shaft 116 carries a spiral gear 123 (Fig. 1a) which meshes with a second spiral gear 124 (see also Fig. 2a) secured on the front end of a transverse feed roll shaft 125 which is journaled between upright plates 38 and 39. A feed roll 126 made of rubber having a hardness of approximately 45 durometer is carried by the shaft 125. Situated immediately above the roll shaft 125 and journaled, like this shaft, between the plates 38 and 39, is an upper feed roll shaft 127 on which is mounted a roll 128 formed of rubber having a hardness of approximately 70 durometer. The pair of shafts 125 and 127 are caused to rotate together but in opposite directions by means of intermeshing spur gears 129 secured on the front ends of the shafts. Hence, the drive from the square drive shaft 116 is transmitted to the lower feed roll 126 by means of the spiral gears 123 and 124, while the drive to the upper feed roll 128 is furnished by the intermeshing gears 129.

The feed rolls 126 and 128 serve to draw the web of tubular, thermoplastic film stock 130 from the supply roll and start it on the first portion of its journey through the machine. As shown in Fig. 1a, the web 130 is withdrawn from the upper supply roll 27 and is threaded first between a pair of idler rolls 131 which are supported for rotation between the vertical plates 48 and 49. The web is then carried downwardly around an idler roll 132 which is supported for rotation between a pair of angles 133 resting upon and secured to the longitudinally extending angles 34 and 35. The web is then led vertically upward and carried around an idler roll 134 which is journaled for rotation between the channels 46 and 47. Next, the web is led down around a tensioning roll 135 which is rotatably supported between a pair of pivoted arms 136. As shown in Figs. 1a and 2a, the arms 136 are supported for pivotal movement on adjustable screw studs 137 which are carried in the outer ends of arms 138 attached to the upright plates 38 and 39. The weight of the arms 136 and of the roll 135 apply tension to the web 130 and serve to keep it taut during its passage from the supply roll 27 to the first pair of feed rolls 126 and 128. After passing around the tensioning roll 135, the web is then led up around an idler roll 139 journaled between the plates 48 and 49 after which the web is led beneath an idler roll 140 journaled between the plates 38 and 39. The web then passes between the feed rolls 126 and 128 which give it an intermittent feeding motion as provided by the square drive shaft 116.

After passing through the feed rolls 126 and 128, the web is taken down around a jolly idler roll 145 which is supported for rotation between a pair of sleeves 146 which are guided for vertical sliding movement on rods 147. At their lower ends the rods 147 are secured to the longitudinally extending angles 44 and 45 while at their upper ends the rods are secured to the bottom flanges of the channels 46 and 47. Springs 148 which are compressed between the upper ends of the sleeves 146 and the bottom flanges of the channels urge the jolly idler roll downward so as to apply tension to the web 130.

After passing around the jolly idler roll, the web is led upwardly and around an evening bar 149 fastened between the plates 40 and 41. After passing over this bar, the web is led between a first pair of feed rolls at the weld station 25. As best shown in Fig. 7, these rolls are comprised of rubber sleeves 150 and 151 supported by shafts 152 and 153, respectively, the rubber of the lower sleeve 150 having a hardness of about 45 durometer while the rubber of the upper sleeve has a hardness of about 70 durometer. The lower shaft 152 is journaled between the upright plates 40 and 41 and has secured to its front end a spiral gear 154 (Fig. 1a) which meshes with a similar spiral gear 155 mounted on the square drive shaft 116. Bearing blocks 156 and 157, which are supported by the upper flange of the channel 46 and are secured to the front face of the vertical plate 40, serve to support roller bearings the inner races of which are provided with square apertures for receiving the drive shaft 116. Intermittent drive is therefore provided to the lower feed roll shaft 152 from the intermittent drive shaft 116 and this drive is transmitted to the upper feed roll shaft 153 by means of a pair of intermeshing spur gears 158 secured to the forward ends of the shafts 152 and 153. Due to the fact that the upper feed roll 151 is of slightly smaller diameter than the bottom feed roll 150, the upper spur gear 158 is made slightly smaller than the lower spur gear 158 so that the shaft 153 will turn slightly faster than the shaft 152. As best shown in Fig. 6, the upper feed roll shaft 153 is journaled at either end in bearing blocks 159 which are guided for vertical sliding movement in the slots provided in the upper ends of upright plates 40 and 41. Downward pressure may be applied to the shaft 153 by means of adjusting screws 160 which are received in threaded holes provided in cap strips 161. Since the rubber from which the lower feed roll 150 is formed is harder than the rubber of the upper roll 151, downward pressure of the upper roll upon the lower roll will result in some deformation of the upper roll but practically no change in shape will take place in the lower roll. Hence, the feed of the web 130 through the machine will not be changed or affected by adjustment of the pressure of the upper roll against the lower roll.

A second pair of feed rolls 164 and 165 is provided at the weld station, these rolls being provided with shafts 166 and 167, respectively. The bottom shaft 166 like the shaft 152, is supported for rotation between the upright plates 40 and 41. The upper shaft 167, like the shaft 153, is journaled between slidable bearing blocks 168 which may be urged downwardly by adjusting screws 169. As in the case of the first pair of feed rolls located at the welding station, the lower roll 164 is made of harder rubber than the upper roll 165 so that the pressure of the upper roll against the lower one will cause deformation of the upper roll but not of the lower roll.

At the back of the machine, the upper roll shafts 153 and 167 are provided with spur gears 172 and 173 (see also Figs. 2a and 5) both of which mesh with a gear 174 of sligthly smaller pitch diameter secured to the rear end of a shaft 175 journaled between the plates 40 and 41. This shaft carries a roll 176 formed of a heat-resistant, resilient material such as silicone rubber which is a synthetic material having molecules formed of long chains of silicon-oxygen units with two methyl groups attached to each silicon atom. This roll cooperates with the edge of the weld bar to provide a combined cutting and welding action on the web 130 in a manner which will be more fully explained hereinafter. Gear 172 on the feed roll shaft 153 will, therefore, provide an intermittent drive to the shaft 175 and, since the gear 174 is slightly smaller than the gear 172, the peripheral surface of the roll 176 will move in the same direction but at a higher rate of speed than the surface of the feed roll 150 since the shaft 175 will turn at a higher rate of speed than the shaft 152. It will also be noted that the upper feed roll shaft 167 will be rotated at the same speed as the feed roll shaft 153 since the gears 172 and 173 are of equal diameter. Drive from the upper feed roll shaft 167 is applied to the lower feed roll shaft 166 through a pair of intermeshing gears 177 and 178 (see Fig. 5) which are secured to the forward ends of the shafts 167 and 166 respectively. Inasmuch as the roll 165 is of slightly smaller diameter than the roll 164, the gear 177 is made slightly smaller than the gear 178 so that rolling contact is provided between the engaging faces of the feed rolls.

*Transfer belts*

After passing through the weld station shown in Fig. 7, the pieces of thermoplastic film stock which have been cut from the web 130 by the weld bar are introduced between a series of upper belts 182 and a corresponding series of lower belts 183 which serve to transport the severed pieces of film stock to the knife station 26, and from the knife station to the point where they are discharged from the machine. As shown in Fig. 7, the left-hand ends of the belts 182 and 183 pass around pulleys 184 and 185, respectively, which are mounted on shafts 186 and 187, respectively, journaled between the plates 40 and 41. The lower shaft 187 is arranged to be driven from the upper feed roll shaft 167 by a pair of intermeshing gears 188 and 189 (see also Figs. 2a and 5). Since the diameter of the feed roll 165 is slightly smaller than the diameter of the pulley 185 plus the thickness of the belt 183, the gear 188 is made slightly smaller in diameter than the gear 189 so as to cause the pulley 185 to be driven at the proper speed and cause the belts 183 to move with the same speed as the peripheral surfaces of the lower feed rolls 150 and 164. After passing over the pulleys 185, the upper flights of the bottom belts 183 proceed to the knife station 26 where they pass around pulleys mounted on a shaft 191 (Fig. 12) journaled between side plates 194 and 195 of a knife carriage which will hereinafter be described in greater detail. The belts are then taken down around an idler roll 192 carried by a shaft 193 journaled between the side plates 194 and 195. The belts are then led up around pulleys mounted on a shaft 196 (see also Fig. 11) which is journaled between the side plates 194 and 195 of the knife carriage. Secured on the forward end of the shaft 196 is a spiral gear 197 which meshes with a second spiral gear 198 provided with a square hole for receiving the drive shaft 116. The upper flights of the belts 183 then continue toward the right-hand side of the machine where they pass around a roll 190 mounted on a shaft 199 (see also Fig. 4) journaled between the upright plates 36 and 37. On the forward end of the roll shaft 199 is a spiral gear 200 which meshes with a second spiral gear 201 provided with a square hole for receiving the drive shaft 116. As best shown in Fig. 4 the belts 183 are then taken down and around an idler roll 202 mounted upon a shaft 203 which is rotatably journaled between the plates 36 and 37. The bottom flights of the belts 183 then proceed to the left passing beneath the knife station as shown in Fig. 12 and proceeding to the weld station where they pass around idler roll 204 (Fig. 6) mounted on a shaft 205 journaled between the upright plates 40 and 41.

The lower flights of the upper belts 182 travel from the pulleys on the shaft 186, which is driven from shaft 187 by intermeshing gears 206 and 207, to the knife station 26 (Fig. 12) where they pass around pulleys mounted on a shaft 210 which is journaled between the side plates 194 and 195 of the knife carriage. The belts then proceed vertically upward and over an idler roll 211 carried by a shaft 212 after which the belts proceed vertically downward and around pulleys mounted on a shaft 213, the shafts 212 and 213 being suitably journaled for rotation between side plates 194 and 195. After passing around the pulleys on the shaft 213, the lower flights of the upper belts proceed toward the right-hand end of the machine where they pass around a roll 209 carried by a shaft 214 journaled between the vertical plates 36 and 37. Thereafter the belts are returned toward the left-hand end of the machine, the upper flights being passed over an adjustable idler roll 215 (Fig. 4) journaled between a pair of arms 216 which arms are secured to the side plates 194 and 195 by bolts 217 which can be tightened to hold the arms 216 in position after the idler roll 215 has been adjusted to the proper elevation. After passing over the idler roll 215, the upper flights of the belts 182 proceed to the left-side of the machine and pass around the belt pulleys 184 on the shaft 186 as shown in Fig. 7.

The belt pulleys carried by the shafts 186, 187 (Fig. 7)

210, 191 and 213, 196 (Fig. 12) are all of similar construction and may be understood by reference to Fig. 11, wherein the pulleys on shafts 196 and 213 are shown in cross section. As herein shown, the shaft 196 is provided with alternating fixed metal sleeves 218 and rubber rings 219, while the shaft 213 is provided with alternating fixed metal sleeves 226 and free-running metal rings 227, which rings are grooved on their outer peripheries. The rings are adapted to bear against one another, as shown in Fig. 11, and seize the severed pieces of bag material passing therebetween so as to positively feed the material past the points where the pulleys are located.

As previously described herein, and as shown in Fig. 11, the lower pulley shaft 196 is driven from the square shaft 116 through spiral gears 197 and 198. On the rear end of the shaft 196 is a spur gear 220 which meshes with an identical spur gear 221 secured to the rear end of shaft 213. Hence, the upper pulley shaft 213 will be driven in synchronism with the lower pulley shaft 196. Gears similar to the spur gears 220 and 221 are secured to the rear ends of the pulley shafts 191 and 210 (Fig. 12) and an idler gear 222 (Fig. 2b) is interposed between the gears 220 on the lower pulley shafts 196 and 191 so that these shafts will be driven in the same direction and at the same speed. As previously described, the belt rolls 199 and 209 at the right-hand end of the machine are driven from the square shaft 116 by spiral gears 200 and 201 which provide the drive for the lower roll shaft 199. On the rear end of the shaft 199 is a spur gear 223 which meshes with an identical spur gear 224 fast on the rear end of the upper shaft 214. In this way, the roll for the upper belts 182 is driven in synchronism with the roll for the lower belts 183. The finished bags will be ejected from the right-hand end of the machine as indicated in Figs. 1b, 2b and 4 where the bag being ejected is indicated by reference numeral 225.

Weld bar

The bag making machine shown herein is provided with a weld bar of novel construction which cooperates with a silicone roll disposed beneath the web of film stock passing under the weld bar. The detailed construction of the weld bar is shown in Figs. 6, 7, 8 and 9 wherein it is indicated by reference numeral 230. This bar is preferably formed of a light metal having high heat conductivity such as aluminum, or some alloy thereof such as aluminum bronze. The weld bar 130 may be formed in two parts as shown in Fig. 7 so that an electric heating element 231 can be inserted in grooves formed in the two separable portions of the bar after which the latter may be fastened together by screws 232. As shown in Fig. 8, the ends of the heater element 231 are brought out from the top of the bar where they are provided with threaded electrical connections 233. A tubular thermostat 234 of the liquid-filled type is positioned alongside the weld bar and is electrically connected with the heating element 231 so as to provide regulation of the temperature of the weld bar.

To assist in maintaining the temperature of the weld bar uniform, it is jacketed within a sheet metal cover 235 which is considerably larger than the weld bar and spaced therefrom so as to enable a solid type of insulating material to be interposed between the cover and the bar. The assembly of the weld bar 230, the insulation 236, and the cover 235, is attached to a mounting bar 237 by means of screws 238 which pass downwardly through holes provided in the bar 237 and screw into threaded holes provided therefor in the weld bar 230. As best shown in Fig. 5, the bar 237 is provided toward either end thereof with a depending plate or tongue 239 which is adapted to be received within guides 240 secured to the upper ends of the upright plates 40 and 41. The tongues 239 and guides 240 assist in guiding the weld bar assembly for vertical rectilinear movement on the machine frame.

The weld bar must be reciprocated once during each dwell period of the feed rolls so as to sever the web 130 and seal the adjacent edges of the tubular material after they have been cut. The power drive for operating the weld bar is taken off of the input shaft 76 of the intermittent gear drive 24 (Fig. 1b). As herein shown, the shaft 76 has secured thereto a sprocket which drives a chain 242 which passes around a sprocket mounted on the right-hand end of a square drive shaft 243. The shaft 243 is journaled at its right-hand end in roller bearings mounted in bearing blocks 244 which are supported upon and secured to a transversely extending plates 245 which is secured at either end to the upright plates 60 and 61. As shown in Figs. 2a, 3 and 5, the left-hand end of the square drive shaft 243 is supported in roller bearings mounted in bearing plates 245 which, in turn, are supported upon and secured to an angle 246 which is secured to the inner face of the vertical plate 38. As shown in Fig. 5, the shaft 243 has mounted thereon between the bearing plates 245 a spiral gear 247 provided with a square hole for receiving the shaft 243. The gear 247 meshes with a second spiral gear 248 secured to a transverse shaft 249 which is journaled in the upright plates 40 and 41. Two similar plate cams 250 are secured to the front and rear ends of the shaft 249, the shape of the cams being best shown in Fig. 1a. Each cam has cooperating therewith a follower roll 251 (Fig. 5) which is carried by a sleeve 252 secured to a vertically extending rod 253 which is guided for vertical sliding movement in bearings 254. Each rod 253 is urged upwardly so as to maintain the rollers 251 in contact with the peripheral faces of the cams by a compression spring 255 acting at one end against a collar 256 secured to the rod 253, and at the other end against one of the bearing supports 254 for the rod. Mounted on the lower end of each rod 253 is a balancing spring 257 which acts against a collar 258 secured to the rod and against the underside of an angle 259 on which the bearing 254 is mounted. The spring 257 is weaker than the spring 255 and serves to prevent binding of the rod 253 in its bearings under the influence of the cam 250 acting against the follower roll 251. Each rod 253 is connected at its upper end to the mounting bar 237 by means of a spring 260 compressed between a pair of locknuts 261 and the upper face of the bar which urges the bar down against a lower nut 262.

Since the drive for the weld bar is taken from the input to the intermittent gear drive, the weld bar will operate in synchronism with the mutilated gear 79 and, by proper adjustment of the shaft 249 with respect to the square drive shaft 243 (Fig. 5), the weld bar may be caused to operate at the proper time during the dwell period of the feed rolls.

The operation of the weld bar may be best understood by referring to Figs. 7 and 9 of the drawings. As shown in these figures, the weld bar is illustrated in its lowermost position after it has been brought down against the tubular film stock and presses in against the silicone covered roll 176 under the action of the springs 260. Referring to Fig. 9, the lower edge of the weld bar 230 has formed thereon a narrow tenon 265 which is connected with the upper body portion of the weld bar by slightly inclined shoulders 266. Hence, when the bar is brought down against the resilient roll 176 over which the film stock 130 is fed, the tenon 265 of the heated bar will press into the roll 176 as illustrated in Fig. 9. Since the weld bar is preferably operated at a temperature in the neighborhood of 500 to 600° F., the pressure of the tenon 265 together with the high temperature to which it is heated will cause it to immediately cut through the thermoplastic material of the web 130 whereupon the shoulders 266 will press together the edges of the severed tube against the surface of the resilient roll 176. The shoulders 266 are approximately $\frac{1}{32}$ inch wide so that a weld of approximately that width will be produced along each edge of the severed film stock. At the same time, the sides of the tenon 265 will tend to fuse the ends of the severed thermoplastic material so as to provide a butt weld thereon in addition to the lap weld provided by the shoulders 266. The finished weld is illustrated in Fig. 10 wherein the severed and welded pieces of tubular film stock 130 are shown greatly enlarged. As herein shown, a lap weld approximately 1/32 inch wide is provided on each end of the severed material while a butt weld 268 is provided on the extreme end thereof. Thus a very narrow but secure weld is provided along each edge of the severed material and, in tests of this weld, it has been found that the thermoplastic material of the web will rupture or tear before the weld itself will give way. Also, due to the inclination of the shoulders 266, the lap weld gradually tapers off so that a crisp edge is not formed along the inner margin 269 (Fig. 10) of the weld.

The high temperature of the weld bar 230 greatly speeds up the welding operation and it has been found that only 100 to 150 milliseconds is required to effect the double weld produced by my novel design of weld bar. Also, since the tip of the weld bar passes through the thermoplastic film stock and since the shoulders 266 press against the resilient surface of the roll 176, accurate vertical adjustment of the weld bar is not required and a vertical misalignment of from .010 to .015 inch may be tolerated without adversely affecting the quality of the weld produced by the bar. Therefore, warping of the weld bar will not result in the production of inferior articles so long as the warpage in a vertical direction does not exceed the .015 inch tolerance mentioned above.

The shoulders 266 may, due to the high heat of the weld bar, tend to adhere to the edges of the film stock at the conclusion of the welding operation. If such sticking occurs, it may be overcome by coating the shoulders 266 and, for that matter, the entire lower portion of the bar with polytetrafluoroethylene resin which prevents sticking, particularly with polyethylene film.

It may likewise be found that the welded edges of the film tend to adhere to the surface of the silicone roll 176 and, for this reason, the roll 176 is driven slightly faster than the feed rolls so that the roll will tend to strip itself from the welded film stock.

To prevent the radiant heat from the high temperature weld bar from melting the film stock located therebeneath when the machine is at rest, the bar is shielded therefrom by a housing best shown in Figs. 6 and 7 which consists of a pair of side plates 270 which are supported on transverse rods 271 which are secured at their opposite ends to the guides 240 (Fig. 5). In order to close the lower end of the housing when the weld bar is in its raised position and thereby shield the hot bar from the web of film stock 130, a pair of pivoted shutters 272 are provided. These shutters are in the form of strips having sidearms 273 formed on either end thereof which are pivoted on stationary frame studs 274. The arms 273 operate scissors fashion and pins 275 attached to each end of the weld bar and disposed between the spread, upper ends of the arms 273 cause the shutters 272 to be moved apart when the weld bar moves down. Hence, as the weld bar descends, the pins 275 will act upon the inclined portions of the arms 273 thereby spreading apart the shutters 272 and permitting the weld bar to pass therebetween as indicated in Fig. 7. Suitable spring means (not shown) may be utilized to normally maintain the shutters closed.

*Cut-off knife*

Reference is made to Figs. 1b, 2b, 11 and 12 for a showing of the structure employed at the knife station 26 for cutting in two the pieces of film stock which previously have been welded at either end by the weld bar. As previously described, the pieces of film stock issuing from the weld station are carried to the knife station between the belts 182 and 183. Also, as previously described, these belts are given an intermittent feeding motion in synchronism with the intermittent feeding operation of the feed rolls which advance the film stock web 130 into the weld station. As already pointed out, the knife station is also made adjustable as to its position with respect to the weld station so that the machine may be adjusted to produce bags of different lengths. To this end, the knife station 26 is constructed in the form of a traveling carriage which may be shifted back and forth along the channels 46 and 47. The knife carriage includes the previously described side plates 194 and 195 which plates are connected by a top plate 281 and a bottom plate 282 (Fig. 11). The carriage frame formed by plates 194, 195, 281 and 282 is guided for sliding movement back and forth along the channels 46 and 47 by upper angles 283 and lower angles 284 which are secured to the side plates in a spaced apart relation so that the horizontal flanges of the angles engage with the upper and lower flanges of the channels and thereby guide the carriage for longitudinal sliding movement along the channels. Backward and forward feeding movement of the carriage is effected by longitudinally extending screws 285 disposed between the flanges of the channels 46 and 47. Each screw is journaled at its right-hand end in a bearing block 286 (Fig. 1b) secured to one of the channels while, at their left-hand ends, the screws are journaled in a bearing bracket 287 (Fig. 1a) likewise attached to and supported by one of the channels. The web of each of the channels 46 and 47 is provided with a longitudinally extending slot 288 for receiving an elongated nut 289. Each nut 289 is secured to its adjacent side plate 194 or 195 of the knife carriage frame so that when the screws 285 are rotated, feeding movement of the carriage will be produced.

Rotation of the screws 285 is effected by means of a hand crank 290 mounted on the rear end of a transverse shaft 291 which is journaled at either end in the channels 46 and 47. Each screw 285 is provided at its right-hand end with a bevel gear 292 which meshes with a corresponding bevel gear 293 secured to the transverse shaft 291. Hence, when the hand crank 290 is turned, the screws 285 will both be rotated in the same direction by the bevel gearing so as to cause the knife carriage to be fed backward or forward along the channels 46 and 47.

As described earlier herein, the belt shafts 191, 196, 210 and 213 (Fig. 12) which are carried between the side plates of the knife carriage are driven from the square shaft 116 by spiral gears 197 and 198 (Fig. 11). As shown in Figs. 1b and 2b, the spiral gear 198 is mounted on the square drive shaft 116 between two bearing blocks 296 and 297 secured in spaced relation to the upper angle 283 mounted on the side plate 194 of the knife carriage. Spacers are provided on the shaft 116 between the spiral gear 198 and the blocks 296 and 297 so as to maintain the gear properly located with respect to its companion gear 197. Hence, as the carriage is shifted back and forth in the machine along the drive shaft 116, drive through shaft 116 to the belt pulleys will be maintained in all positions of the carriage. Means, such as a removable pin connection, is provided between the gear 197 and its shaft 196 so that the belt pulleys will be free to rotate, as the carriage is shifted, by removal of the pin from the gear 197 and shaft 196.

Also supported on the movable carriage and arranged for operation from the square shaft 243 is a cut-off knife 300 (Fig. 12) which extends across practically the entire width of the carriage and which is secured by screws or other suitable fastening means to a square bar 301 provided with a pivot pin 302 on either end thereof. The bar is guided for substantially vertical, reciprocating movement by a pair of curved arms 303, one at either end of the bar, which are journaled on pivot pins 304 carried by brackets 305 mounted on a transverse bar 306 attached at either end to the side plates 194 and 195.

The bar 301 and the knife 300 attached thereto, are urged to rotate clockwise on the pivot pins 302, as viewed in Fig. 12, by springs 307 connected at one end to upstanding pins 308 secured to the bar 301 and at the other end to an anchor rod 309 extending between side plates 194 and 195. Clockwise rotation of the knife in the "up" position thereof, as shown in Fig. 12, is prevented by a stop bar 310 extending across the carriage between the side plates. Located immediately beneath the bar 310 but with sufficient space to permit the passage of the welded pieces of film stock therebetween, is a shear bar 311 likewise extending across the carriage between the side plates thereof. Hence, when the knife is lowered by means hereinafter to be described, the cutting edge of the blade 300 will cooperate with the shear bar 311 to cut the pieces of film stock intermediate the welded ends thereof and thus form two bags open at one end and closed at the other.

Operation of the knife is effected by power derived from the square shaft 243. As shown in Figs. 11 and 12, this shaft is supported at the knife station by a pair of spaced apart bearing blocks 315 and 316 whose inner races are provided with square holes for receiving the shaft. Disposed between the bearing blocks on the shaft 243 is a spiral gear 317 which is held in place between the blocks by appropriate spacers mounted on the shaft 243. This gear meshes with a companion spiral gear 318 which is secured to a transverse shaft 319 journaled at either end in bearings supported by the side plates of the knife carriage. On each end of the shaft there is secured thereto a plate cam 320 which is contacted by a roller 321 carried by a sleeve 322 secured to a vertically extending rod 323. Each rod 323 is guided for vertical sliding movement in bearings 324 attached to the frame of the carriage. At its upper end, each rod 323 is provided with an aperture for receiving one of the pivot pins 302 projecting from the ends of the square bar 301. The roller 321 is urged upwardly into contact with the peripheral surface of the cam 320 by a strong spring 325 compressed between one of the bearings 324 and a collar 326 secured to the rod 323. A weaker, balancing spring 327 is provided on the lower end of each rod 323 and is compressed between the bottom plate 282 of the carriage and a collar 328 (Fig. 12) fast on the lower end of the rod. By proper positioning of the cams 320 with respect to the square drive shaft 243, the knife 300 may be caused to move downward and sever the piece of film stock disposed therebeneath during each dwell period of the belts 182 and 183.

*Supply roll brake*

To prevent overrunning of the film stock supply rolls during the dwell period of the feed mechanism for the film stock, a solenoid operated brake is provided for stopping the rotation of each roll at the end of the feeding stroke of the bag machine. As shown in Fig. 3, each roll is mounted on a spool 335 having a square hole therein for receiving a square supporting axle 336. Each axle is journaled at either end in suitable bearings provided in the upright plates 50 and 51 and each axle has secured thereto at either end on the outside of the plates a brake drum 337 (Fig. 1a). Cooperating with each drum is a brake shoe 338 pivotally attached at one end to the plates 50 and 51 and apertured at the other end to receive an operating rod 339. At its lower end each rod is attached to the armature 340 of a solenoid 341 which is adapted to be energized at the beginning of the dwell period of the feeding mechanism so as to pull down on its associated rod 339 and cause the brake shoes 338 to be pressed against the drums 337. The actuation of the rods 339 by the solenoid 341 is quite abrupt and, to cushion the blow when the solenoids are energized, a coil spring 342 is interposed between each brake shoe and the operating rod 339. Also, to apply some frictional restraint to the rotation of the supply rolls even during the period when film stock is being withdrawn therefrom and fed through the machine, compression springs 343 are provided on the rods 339, each of these springs being compressed between the horizontal flange of an angle 344 mounted on plates 50 and 51 and collars 345 secured to the bars.

Timing of the energization of the solenoid 341 is controlled from a plate cam 356 (Figs. 1b and 17) which is mounted on the left-hand end of shaft 76 where it cooperates with leaf contacts 347 mounted on the left sidewall 77 of the intermittent gear housing. The contacts 347 are connected in series with the solenoid windings 341 and a suitable source of 110 volt current so that each time the high portion of the cam 346 moves beneath the contacts the latter will be closed and the solenoids energized to operate the brakes for the supply rolls. The cam 346 is suitably positioned on the shaft 76 so that the brakes will be energized at the beginning of the dwell period of the feed mechanism and deenergized at the end thereof.

*Operation*

From the foregoing description of the construction and operation of my novel bag making machine it is believed that the evident superiority of my machine over existing plastic bag making machines will be obvious. However, in order to sum up and recount the novel features of my machine, I will now briefly describe the manner in which it operates to produce plastic bags from thermoplastic, tubular film stock at a much greater rate of speed than conventional bag making machines and with a considerable saving of bag making material.

Referring particularly to Figs. 1a and 1b, the tubular, thermoplastic film stock on one of the supply rolls 27 or 28 mounted at the left-hand end of the machine is threaded through the various idler and tensioning rolls and the first pair of feed rolls mounted on shafts 125 and 127 and thence into the feed rolls at the weld station 25. The feed rolls 150, 151, 164 and 165 (Fig. 7) at the weld station are given an intermittent feeding movement from the square drive shaft 116. This shaft is driven by power supplied by electric motor 21 which drives the mutilated gear of an intermittent gear drive mechanism through a variable speed drive 22. By adjustment of the drive 22 the number of indexes or feeding strokes of the machine per given unit of time may be varied as desired. The output from the intermittent gear drive mechanism is applied to a second variable speed drive 23 which, in turn, drives the square shaft 116. By adjustment of the variable speed drive 23 the extent of angular rotation of the drive shaft 116 may be varied as desired for each feeding stroke of the drive mechanism thereby enabling the length of feed to be suitably adjusted.

During the dwell period of the feed rolls, the weld bar 230 is moved down to cut the film stock transversely of its length and to simultaneously provide a weld along each edge of the severed stock. This operation of the weld bar during the dwell period of the feed mechanism is effected by cams 250 which are driven in synchronism with the mutilated gear of the intermittent gear drive mechanism. Hence, the movement of the operating cams may be synchronized with the start and stop operation of square drive shaft 116 which drives the feed rolls of the machine.

As shown in Fig. 9, the lower edge of the weld bar is provided with a narrow tenon 265 which, due to the high temperature of the bar (between 500 and 600° F.), will press into the elastic roll 176 located beneath the weld bar and sever the web of film stock while the shoulders 266 on either side of the tenon 265 will press the edges of the film stock against the elastic roll 176 and thereby provide a narrow lap weld along each edge of the severed stock. Simultaneously, the side faces of the tenon 265 will fuse the ends of the film stock and provide a butt weld therealong. Due to the high heat employed on the weld bar 230, the weld time employed in my machine is materially reduced from that required by the prior art devices and, hence, the dwell time of the film stock for the welding operation may be considerably reduced. This provides more time for the feeding of the film through the machine and greater production rates may thereby be achieved. Also, by welding both edges of the film stock at once in place of welding only one edge at a time, twice as many bags may be produced with each feeding movement of the machine as previously.

After welding of the adjoining edges of the film stock has been achieved, the severed piece of stock sealed at both ends, is advanced through a distance equal to the length of two bags, after which the machine again dwells to permit the next operation of the weld bar and cut-off knife to take place. The severed piece of film stock sealed at both ends is carried to the knife station between a plurality of upper belts 182 and lower belts 183 which are intermittently operated in synchronism with the feed rolls at the weld station. The cut-off knife at the knife station 26 is mounted in a movable carriage which may be adjusted by hand crank 290 toward or away from the weld station so as to permit the machine to be adjusted for the manufacture of bags of varying lengths. As each piece of film stock is advanced from the weld station to the knife station the cut-off knife operates to cut in two the piece of stock sealed at both ends so as to form two bags sealed at one end and open at the other end. The finished bags are thereafter discharged from the right-hand end of the machine where they may be caught in a suitable receptacle therefor (not shown).

It will thus be seen that not only may bags of superior quality be made on my machine at a much higher rate of production than with previous machines, but also a considerable saving of the plastic bag-making material may be effected since there is no waste material remaining on the bag beneath the seam.

While I have described my invention in connection with one possible form or embodiment thereof and, therefore, have used certain specific terms and language herein, it is to be understood that the present disclosure is illustrative rather than restrictive and that changes or modifications may be resorted to without departing from the spirit or scope of the claims which follow.

Having thus described my invention, what I claim as new and useful, and desire to secure by United States Letters Patent is:

1. In a machine for forming bags from a multi-ply web of thermoplastic film stock, the combination of means for intermittently feeding the web through the machine, a device for severing the web transversely of its length and for simultaneously sealing substantial areas of the plies along both of the severed edges thereof, and means for operating said device in synchronism with said feeding means to cause said web to be severed and sealed each time it is brought to rest by said feeding means.

2. The machine of claim 1 including a cutter spaced from said severing and sealing device in the direction of the length of the web, and means, coordinated with said feeding means, for operating said cutter to cut the web transversely of its length each time it is brought to rest by said feeding means.

3. The machine of claim 2 wherein means is provided for adjusting the position of said cutter with respect to said severing and sealing device so as to enable bags of different lengths to be produced by the machine.

4. The machine of claim 1 wherein said severing and sealing device includes an electrically heated weld bar.

5. The machine of claim 1 wherein said severing and sealing device includes a heated weld bar, and a resilient roll disposed on the opposite side of the web from said bar which roll is adapted to cooperate with said bar for severing and sealing the film stock.

6. The machine of claim 5 including means for intermittently rotating said roll in synchronism with said feeding means.

7. The machine of claim 6 wherein said rotating means is so constructed and arranged as to operate said roll at a speed greater than that of said feeding means.

8. A machine for forming bags from a multi-ply web of thermoplastic film stock comprising means for severing the web transversely of its length and for simultaneously sealing both of the cut edges thereof, said means including a heated weld bar having a parting edge, and a pair of pressure faces disposed one on either side of said parting edge.

9. The machine of claim 8 including an elastic roll disposed on the opposite side of said web from said bar, said roll being adapted to receive said parting edge and cooperate with said pressure faces to sever and seal the film stock.

10. In a machine for forming bags from a multi-ply web of thermoplastic film stock, the combination of means for intermittently feeding the web through the machine, a weld bar adapted to simultaneously sever the web transversely of its length and seal both of the severed edges thereof, a cutter spaced from said weld bar in the direction of the length of the web for cutting the welded pieces of film stock intermediate their ends, and a common driving means for operating both said weld bar and said cutter each time the web is brought to rest by said feeding means so as to effect, simultaneously, severing and sealing of the web by the weld bar, and cutting of the welded pieces of film stock by said cutter.

11. The machine of claim 10 including means for adjusting the position of said cutter with respect to said weld bar so as to enable bags of different lengths to be produced by the machine.

12. A machine for forming bags from a multi-ply web of thermoplastic film stock comprising a weld bar positioned above the web for severing the same and for simultaneously sealing the severed edges thereof, a resilient roll positioned beneath the weld bar and below the web for cooperating with the weld bar in the severing and sealing of the film stock, means for moving said weld bar into and out of engagement with said web and said roll, and means for rotating said roll after each operation of said weld bar in order to bring a different portion of the roll into position to engage the bar on the next operation thereof.

13. A weld bar for severing and sealing a multi-ply web of thermoplastic film stock comprising means for heating said bar and maintaining the same in a heated condition during welding operations, means on said bar for severing the film stock, and additional means on said bar for simultaneously forming a weld along both edges of the parted film stock.

14. A weld bar for severing and sealing a web of multi-ply, thermoplastic film stock comprising means for heating said bar and maintaining the same in a heated condition during welding operations, a narrow tenon extending along the bottom edge of said bar for severing the film stock, and a pair of shoulders disposed one on either side of said tenon for simultaneously forming a weld along both edges of the parted film stock.

15. A weld bar for severing and sealing a web of multi-ply, thermoplastic film stock comprising a narrow tenon extending along the bottom edge of said bar for severing the film stock, and a pair of shoulders on said bar disposed one on either side of said tenon for simultaneously forming a weld along both edges of the parted film stock.

16. The weld bar of claim 15 in which said shoulders are slightly inclined in an upward and outward direction so as to cause gradual reduction of the pressure applied by the shoulders to the edges of the cut film stock, said pressure being reduced from a maximum adjacent the tenon to a minimum adjacent the outer edges of the shoulders.

17. A weld bar for cutting and sealing a web of multi-ply, thermoplastic film stock comprising a narrow tenon extending longitudinally along the edge of said bar for severing the film stock, a pair of longitudinally extending shoulders formed on said bar for simultaneously forming a weld along the parted edges of the film stock, said shoulders being located one on either side of said tenon, and a heating means for maintaining the bar at a temperature of from 500° to 600° F.

18. In a machine for forming bags from a multi-ply web of thermoplastic film stock, the combination of means for intermittently feeding the web through the machine, and means for operating said feeding means including a motor, a variable speed drive mechanism driven by said motor, an intermittent motion device driven by said mechanism, a second variable speed drive mechanism driven by said device, and a driving connection between said second variable speed drive mechanism and said feeding means whereby an intermittent drive is provided in which the number of feeding strokes per minute and the amount of film stock fed on each stroke of the feeding means may be varied as desired.

19. The machine of claim 18 in which both of said variable speed drive mechanisms are capable of adjustment to any one of an infinite number of different speed ratios.

20. In a machine for forming bags from a multi-ply web of thermoplastic film stock, the combination of a supply roll containing a continuous web of film stock, means for intermittently feeding the web drawn from the supply roll through the machine, brake means for preventing overrunning of the supply roll when the web is brought to rest by said feeding means, and means for automatically energizing said brake means each time said web is brought to rest and deenergizing said brake means each time the web is given a feeding movement.

21. The machine of claim 20 wherein said energizing means includes a solenoid for actuating said brake means, a pair of electrical contacts for controlling the energization and deenergization of said solenoid, and means operating in synchronism with said feeding means for opening and closing said contacts in proper timing with respect to the starting and stopping of said feeding means.

22. A mechanism for simultaneously severing and sealing the parted edges of a multi-ply web of thermoplastic film stock comprising a transverse weld bar, means for heating said bar, and means on said bar extending lengthwise thereof for exerting on said film stock when said bar is brought into contact therewith a central zone of high pressure and marginal zones of receding pressure.

23. A mechanism for simultaneously severing and sealing the severed edges of a multi-ply web of thermoplastic film stock comprising a transverse weld bar, means for heating said weld bar and maintaining the same in a heated condition during welding operations, a narrow tenon extending along the bottom edge of said bar for severing the film stock, and means on said bar for simultaneously forming a weld along both edges of the parted film stock.

References Cited in the file of this patent

UNITED STATES PATENTS

| | | |
|---|---|---|
| 2,627,213 | Nye | Feb. 3, 1953 |
| 2,636,732 | Howard | Apr. 28, 1953 |
| 2,660,219 | Haas et al. | Nov. 24, 1953 |